US009585192B2

(12) United States Patent
Shibuya et al.

(10) Patent No.: US 9,585,192 B2
(45) Date of Patent: Feb. 28, 2017

(54) ELECTRONIC DEVICE

(71) Applicant: RENESAS ELECTRONICS CORPORATION, Kawasaki-shi (JP)

(72) Inventors: Hiroki Shibuya, Kawasaki (JP); Manabu Okamoto, Kawasaki (JP); Tomohiro Nishiyama, Kawasaki (JP); Norikazu Motohashi, Kawasaki (JP)

(73) Assignee: RENESAS ELECTRONICS CORPORATION, Kawasaki-Shi, Kanagawa (JP)

(*) Notice: Subject to any disclaimer, the term of this patent is extended or adjusted under 35 U.S.C. 154(b) by 0 days.

(21) Appl. No.: 14/749,519

(22) Filed: Jun. 24, 2015

(65) Prior Publication Data
US 2016/0007409 A1    Jan. 7, 2016

(30) Foreign Application Priority Data

Jul. 4, 2014    (JP) .................................. 2014-138976
Oct. 24, 2014    (JP) .................................. 2014-217755

(51) Int. Cl.
*H04W 88/02* (2009.01)
*H04W 84/18* (2009.01)

(52) U.S. Cl.
CPC ............ *H04W 88/02* (2013.01); *H04W 84/18* (2013.01)

(58) Field of Classification Search
CPC .. H04B 1/34; H04B 1/36; H04B 1/034; H01L 23/66; H01L 25/165; H01Q 1/2283; H01Q 1/36; H01Q 1/38; H01Q 1/40; H01Q 9/26; H01Q 9/40; H01Q 9/42; H01Q 13/10; H05K 9/00; H04W 88/02; H04W 88/18
See application file for complete search history.

(56) References Cited

U.S. PATENT DOCUMENTS

| 7,095,372 | B2 | 8/2006 | Soler Castany et al. |
| 2005/0156207 | A1 | 7/2005 | Yazawa et al. |
| 2011/0163919 | A1 | 7/2011 | Suzuki |
| 2014/0023087 | A1* | 1/2014 | Czompo ................. H04W 4/02 370/465 |
| 2015/0214635 | A1* | 7/2015 | Kwon .................... H01Q 21/30 343/853 |
| 2015/0263774 | A1* | 9/2015 | Sa ........................... H01Q 1/48 455/575.7 |

FOREIGN PATENT DOCUMENTS

| JP | 2005-207797 A | 8/2005 |
| JP | 2006-505973 A | 2/2006 |
| JP | 2007-313594 A | 12/2007 |
| WO | WO 2010/026990 A1 | 3/2010 |

* cited by examiner

*Primary Examiner* — Thanh Le
(74) *Attorney, Agent, or Firm* — McGinn IP Law Group, PLLC

(57) ABSTRACT

To achieve the reduction in size of an electronic device. The electronic device serving as an element of a wireless communication system includes a module unit, a battery that supplies electric power to the module unit, and a coupling part that electrically couples the module unit and the battery. The module unit includes a sensor that detects a physical quantity, and a wireless communication unit configured to transmit the data based on an output signal from the sensor.

20 Claims, 25 Drawing Sheets

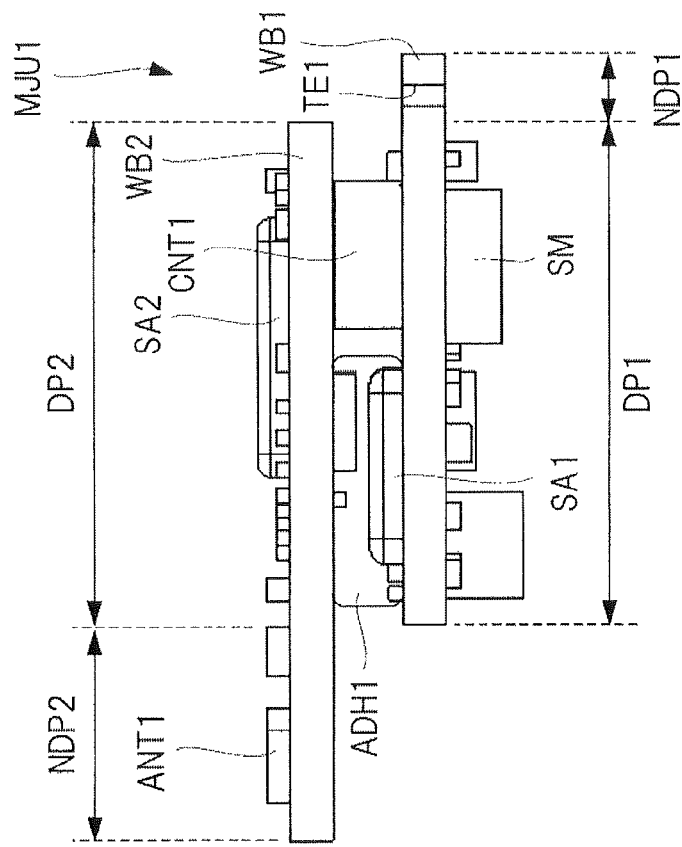
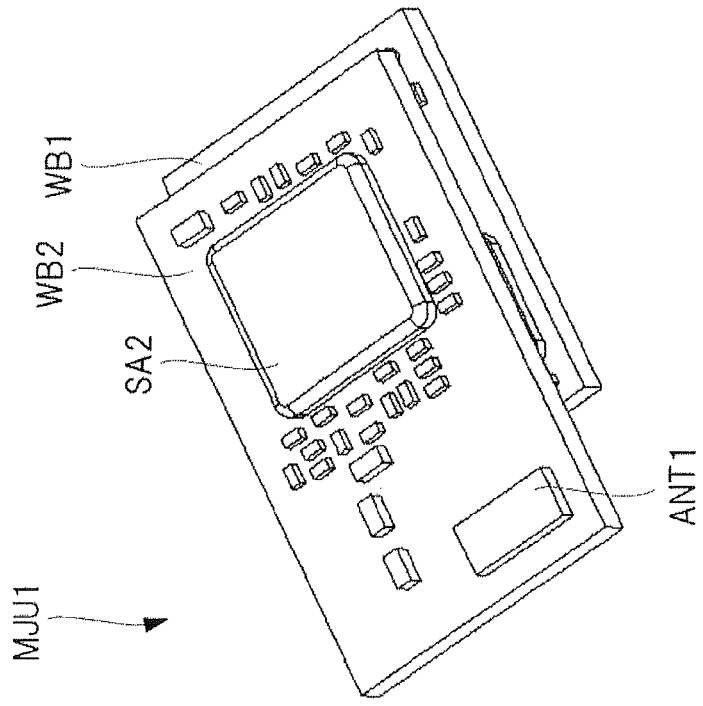
FIG. 10A
FIG. 10B

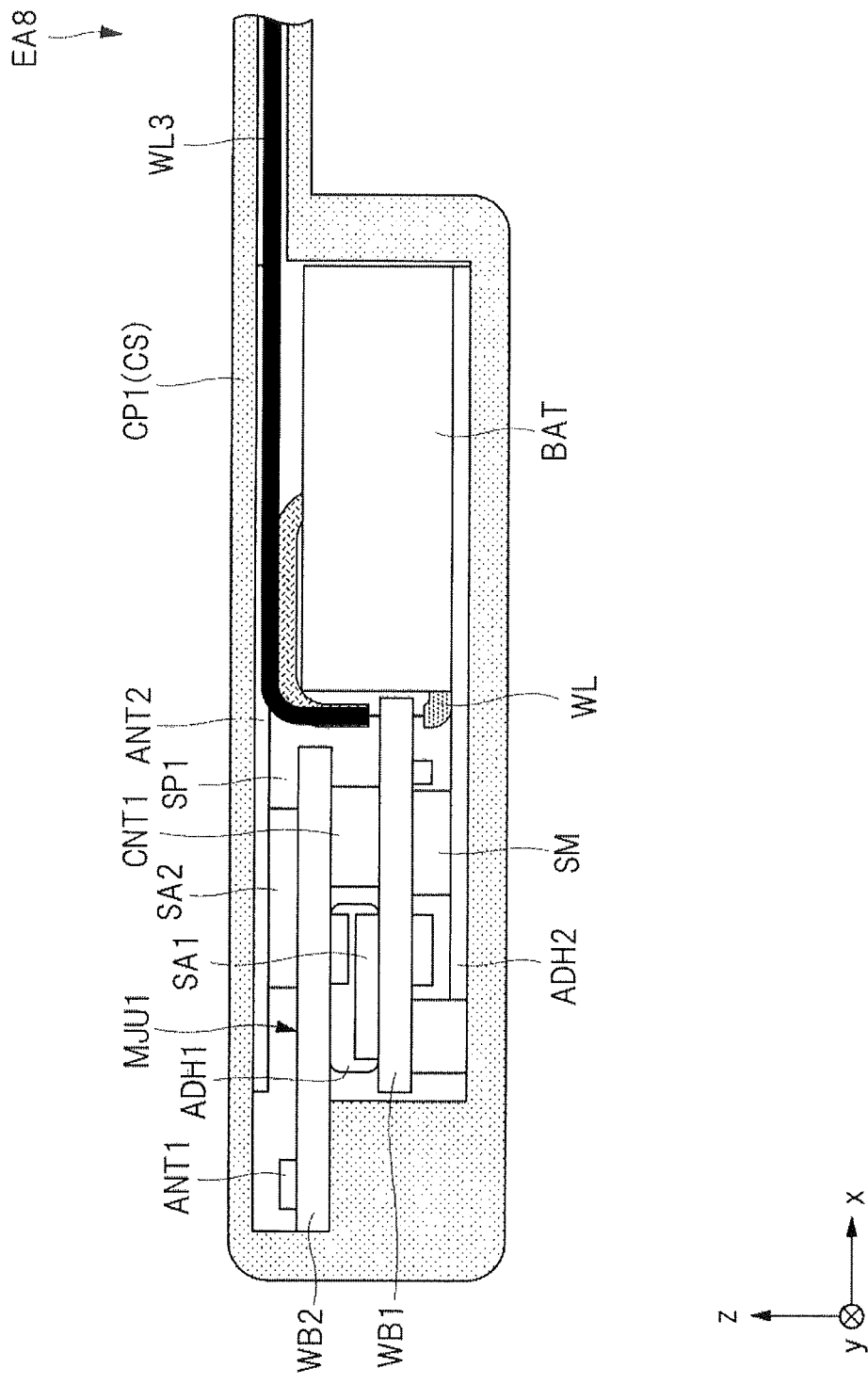

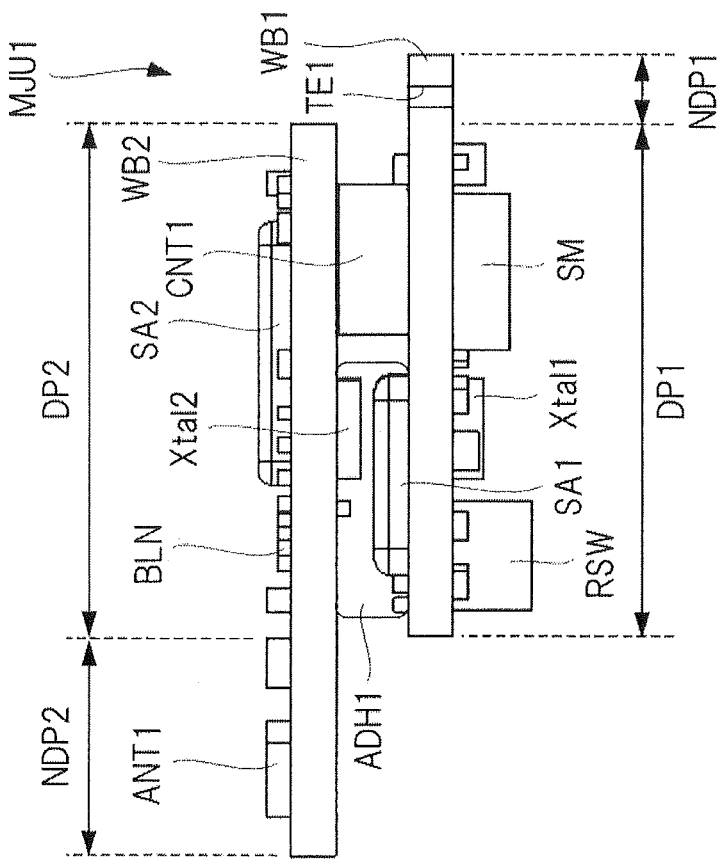
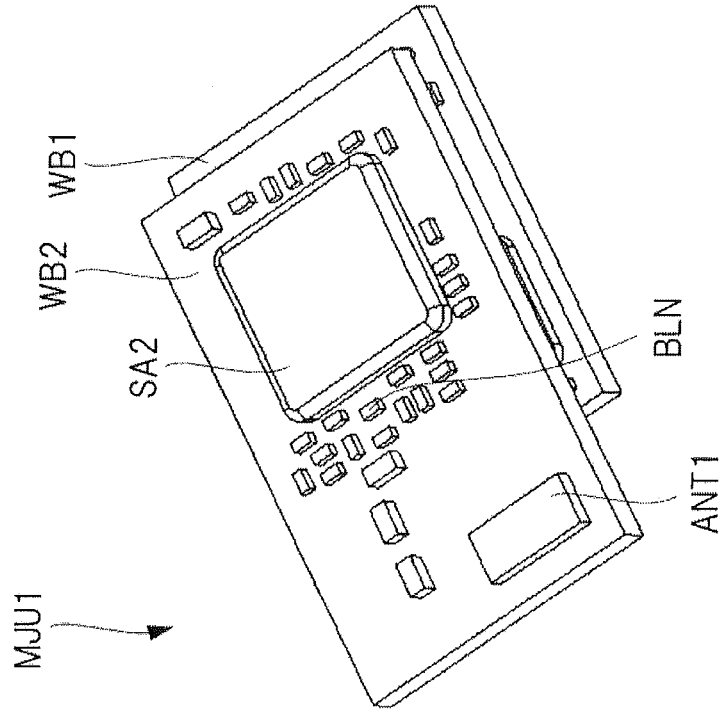
FIG. 21B
FIG. 21A

ELECTRONIC DEVICE

CROSS-REFERENCE TO RELATED APPLICATION

The disclosure of Japanese Patent Applications No. 2014-138976 filed on Jul. 4, 2014, and No. 2014-217755 filed on Oct. 24, 2014 including the specification, drawings and abstract are incorporated herein by reference in their entirety.

BACKGROUND

The present invention relates to an electronic device, and for example relates to a technique effectively applied to the electronic device serving as an element of a wireless communication system.

Japanese patent Laid-Open No. 2007-313594 (Patent Literature 1) describes a structure of arranging, respectively, a sensor control layer and an RF layer so that surfaces in which the sensor control portion and the RF portion are formed serve as the side coming into contact with an MEMS layer so as to sandwich the MEMS layer.

Japanese Unexamined Patent Application Publication (Translation of PCT Application) No. 2006-505973 (Patent Literature 2) describes that an antenna area is arranged over a substrate and a die includes RF terminals.

International publication No. WO2010/026990 (Patent Literature 3) describes that a transmission circuit package and a reception circuit package as a high frequency circuit package are mounted over an antenna substrate.

Japanese Patent Laid-Open No. 2005-207797 (Patent Literature 4) describes an RF interface block that converts a sensing signal subjected to signal processing to a high frequency signal.

SUMMARY

For example, in an electronic device serving as a node of a wireless communication system, the reduction in size is desired. In particular, a current electronic device constituting a node of a wireless sensor network (may be referred to as a WSN) that is one type of the wireless communication systems using sensors has a size at a level sufficient for a person not to feel uncomfortable when he or she carries the electronic device, and further reduction in size at a level sufficient for a person not to feel conscious of the electronic device when he or she carries the electronic device is expected.

The other purposes and the new feature of the present invention will become clear from the description of the present specification and the accompanying drawings.

An electronic device in an embodiment includes a module unit, a battery that supplies electric power to the module unit, and a coupling part that electrically couples the module unit and the battery. The module unit includes a sensor that detects a physical quantity and a wireless communication unit constituted to transmit the data based on an output signal from the sensor.

According to an embodiment, the reduction in size of an electronic device can be achieved.

BRIEF DESCRIPTION OF THE DRAWINGS

FIG. 10A is a perspective view illustrating the mounting configuration of a module unit in the first embodiment;

FIG. 10B is a side view illustrating the mounting configuration of the module unit in the first embodiment;

FIG. 20 is a perspective side view obtained by enlarging and illustrating a part of an electronic device in a second modification;

FIG. 21A is a perspective view illustrating the mounting configuration of a module unit in a fifth embodiment;

FIG. 21B is a side view illustrating the mounting configuration of the module unit in the fifth embodiment;

DETAILED DESCRIPTION

Figure 1:
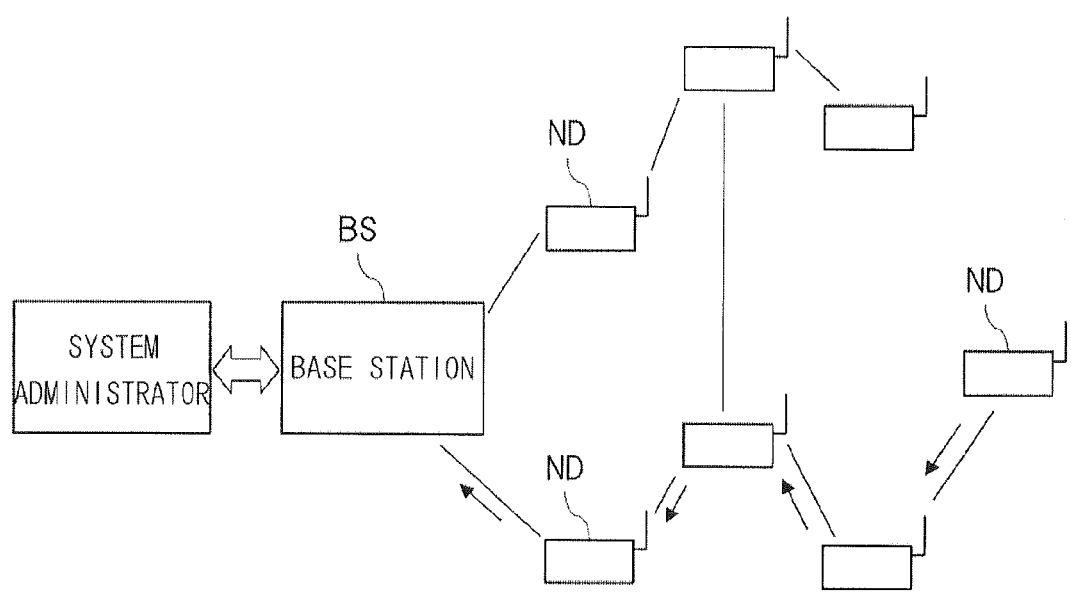
FIG. 1 is a schematic view illustrating a general configuration example of an application using a wireless sensor network.

The following embodiments will be explained, divided into plural sections or embodiments, if necessary for convenience. Except for the case where it shows clearly in particular, they are not mutually unrelated and one has relationships such as a modification, details, and supplementary explanation of some or entire of another.

In the following embodiments, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically.

Furthermore, in the following embodiments, it is needless to say that an element (including an element step etc.) is not necessarily indispensable, except for the case where it is clearly specified in particular and where it is considered to be clearly indispensable from a theoretical point of view, etc.

Similarly, in the following embodiments, when shape, position relationship, etc. of an element etc. is referred to, what resembles or is similar to the shape substantially shall be included, except for the case where it is clearly specified in particular and where it is considered to be clearly not right from a theoretical point of view. This statement applies also to the numeric value and range described above.

In all the drawings for explaining embodiments, the same symbol is attached to the same member, as a principle, and the repeated explanation thereof is omitted. In order to make a drawing intelligible, hatching may be attached even if it is a plan view.

First Embodiment

<Wireless Sensor Network>

In a first embodiment described below, a wireless sensor network will be described as an example of a wireless communication system, but the technical idea in the first embodiment is not limited thereto, but is widely applicable to the wireless communication systems using sensors.

The wireless sensor network as an example of the wireless communication system using sensors is a technique recently drawing large attention, and is expected to be widely utilized. A node (terminal) constituting the wireless sensor network is constituted so as to acquire data output from the sensors of, for example, temperature, illuminance, and acceleration, and the like, and transmit the acquired data using radio waves. For example, in the wireless sensor network, "Multi-hop Ad Hoc communication" is used in which the data acquired at a node is transferred by a bucket relay system between nodes.

Namely, in a conventional mobile communication, infrastructures such as base stations and a fixed network linking the base stations are required to be developed. In contrast, in the wireless sensor network using the "Multi-hop Ad Hoc communication", communication can be performed by autonomous routing of each node itself. Therefore, advantageously, the wireless sensor network does not need a fixed network and the network can be promptly constructed just by arranging nodes in an environment in which the network is desired to be constructed. Note that the form of the wireless sensor network is not limited thereto, but there may be one-to-one-type wireless sensor network, a star-type wireless sensor network, and a mesh-type wireless sensor network, and any of these may be used.

As described above, the wireless sensor network can constitute an autonomous network just by arranging nodes, and thus the construction works at sites can be advantageously reduced. In addition, a dynamic state of the real world can be captured by acquiring the data output from sensors, and thus the tracking of an object and the monitoring of natural environment are expected as promising applications in the wireless sensor network.

FIG. 1 is a schematic view illustrating a general configuration example of an application using the wireless sensor network. In FIG. 1, in the wireless sensor network, a plurality of nodes ND are arranged, and each node ND is constituted so as to observe peripheral environment by using sensing functions. Then, the environment data observed at the respective nodes ND are collected in a base station BS by "Multi-hop Ad Hoc communication" between the nodes ND, for example.

The base station BS is a computer accessible to the wireless sensor network, and puts together and retains the environment data obtained from the wireless sensor network, for example. Here, a computer of a system administrator who wants to acquire environment data from the wireless sensor network may access the base station BS to thereby acquire the needed data, recognize a state of the real environment by analyzing the acquired data, and perform the processing required in an application on the basis of the analyzed state.

<Configuration of Node>

Figure 2:
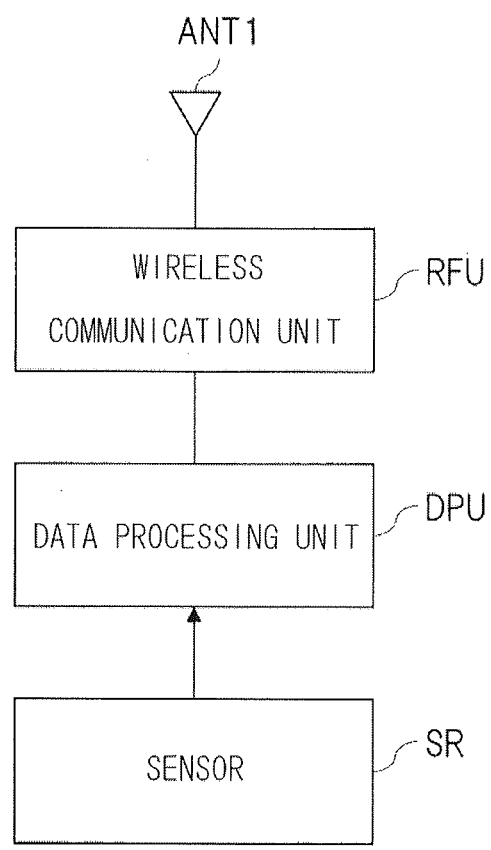
FIG. 2 is a block diagram illustrating a configuration of a node.

Subsequently, the node constituting the wireless sensor network will be described. FIG. 2 is a block diagram illustrating the configuration of the node. As illustrated in FIG. 2, the node that is an element of the wireless sensor network includes, for example, a sensor SR, a data processing unit DPU, a wireless communication unit RFU, and an antenna (communication antenna) ANT1.

The sensor SR is constituted of an element or device which detects physical quantities such as temperature, pressure, flow rate, light, and magnetism, or the amount of change thereof, and is further constituted so as to convert a detected quantity to an appropriate signal and output the same. The examples of the sensor SR include a temperature sensor, a pressure sensor, a flow rate sensor, a photosensor, a magnetic sensor, an illuminance sensor, an acceleration sensor, an angular velocity sensor, an image sensor, and the like.

The data processing unit DPU is constituted to process an output signal output from the sensor SR and output the processed data. In addition, the wireless communication unit RFU is further constituted to convert the data processed by the data processing unit DPU to a radio frequency signal, and transmit the same from the antenna ANT1. Furthermore, the wireless communication unit RFU is also constituted to receive a radio frequency signal via the antenna ANT1.

In the node constituted in this way, when detecting a physical quantity by the sensor SR, a signal is output from the sensor SR and this output signal is input to the data processing unit DPU. Then, the data processing unit DPU processes the input signal and outputs the processed data to the wireless communication unit RFU. Subsequently, the wireless communication unit RFU converts the input data to a radio frequency signal and transmits the radio frequency signal from the antenna ANT1. In this way, in the node, a radio frequency signal corresponding to this physical quantity is transmitted on the basis of a physical quantity detected by the sensor SR.

<Detail Configuration of Node>

Figure 3:
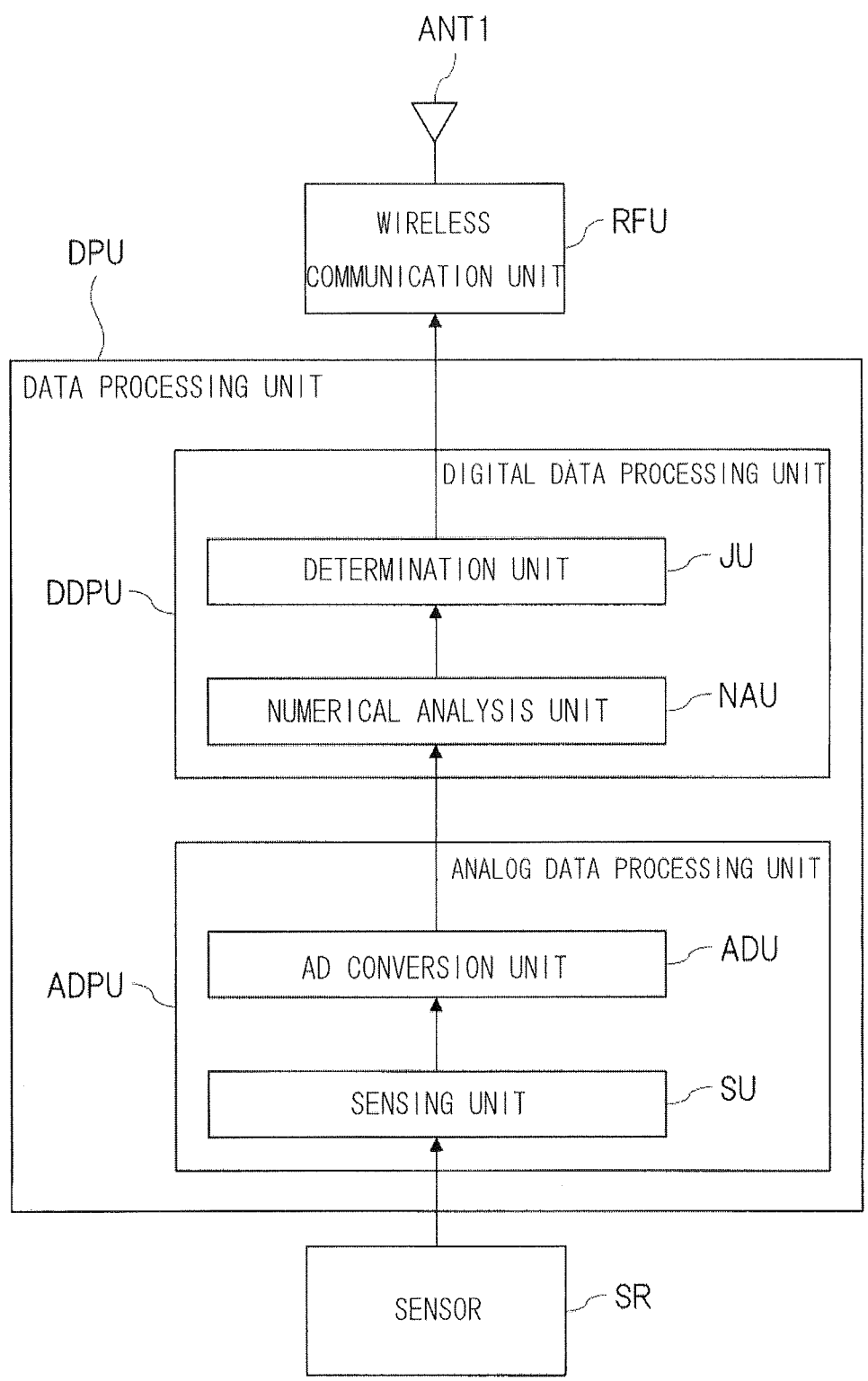
FIG. 3 is a block diagram illustrating a detailed configuration example of a data processing unit included in the node.

Furthermore, a detailed configuration example of the node will be described. FIG. 3 is a block diagram illustrating a detailed configuration example of the data processing unit DPU in the node. As illustrated in FIG. 3, the data processing unit DPU in the node is constituted of an analog data processing unit ADPU and a digital data processing unit DDPU. Then, the analog data processing unit ADPU is constituted to include a sensing unit SU and an AD conversion unit ADU, and the digital data processing unit DDPU is constituted to include a numerical analysis unit NAU and a determination unit JU.

Note that some sensors SR output a digital signal, and in this case, the analog data processing unit ADPU as the data processing unit DPU is not necessary and thus the data processing unit DPU can also be constituted of the digital data processing unit DDPU. In this case, the analog data processing unit ADPU is incorporated into the sensor SR. However, here, as one example, there will be described a form in which the data processing unit DPU is constituted of the analog data processing unit ADPU and the digital data processing unit DDPU, but the form is not limited thereto.

First, the analog data processing unit ADPU will be described. The analog data processing unit ADPU is constituted to input an analog signal output from the sensor SR and convert this analog signal to data that is easily handled, and includes the sensing unit SU and the AD conversion unit ADU.

The sensing unit SU is constituted to include, for example, an amplifier circuit, a transimpedance circuit, a filter circuit, and the like. The output signal output from the sensor SR is minute and there are cases where the signal format thereof is not suitable for the processing in the digital data processing unit DDPU. Then, a circuit is required that amplifies a minute analog signal output from the sensor SR to an analog signal having a magnitude suitable for the input to the digital data processing unit DDPU. In addition, the output signal output from the sensor SR may also be in the form of current instead of voltage. In this case, the AD conversion circuit that converts an analog signal to a digital signal can receive only a voltage signal. For this reason, there is required a circuit that amplifies the current signal to a voltage signal having an appropriate magnitude while converting a current signal to a voltage signal. This circuit is called a transimpedance circuit and is an analog circuit serving as both a conversion circuit and an amplifier circuit. Furthermore, the output signal from the sensor SR may contain an unwanted frequency signal (noise). In this case, the noise makes it difficult to acquire the output signal from the sensor SR. Accordingly, for example, when the noise has a frequency higher than the output signal, the noise needs to be removed using a low pass filter circuit. On the other hand, when the noise has a frequency lower than the output signal, the noise needs to be removed using a high pass filter circuit.

As described above, since it is difficult to directly handle the output signal from the sensor SR, the analog data processing unit ADPU is provided, and in the analog data processing unit ADPU, the sensing unit SU including the above-described amplifier circuit, transimpedance circuit, and filter circuit is provided. The series of analog circuits constituting the sensing unit SU are also referred to as an "analog front end (AFE)."

Next, the AD conversion unit ADU is constituted so as to convert analog data output from the sensing unit SU to digital data. Namely, since the digital data processing unit DDPU can handle only digital data, the analog data needs to be converted to digital data by the AD conversion unit ADU.

Subsequently, the digital data processing unit DDPU is constituted so as to input the digital data output from the analog data processing unit ADPU and process this digital data, and includes, for example, the numerical analysis unit NAU and the determination unit JU. At this time, the digital data processing unit DDPU is constituted of, for example, a micro control unit (MCU).

The numerical analysis unit NAU is constituted so as to input the digital data output from the analog data processing unit ADPU, and so as to perform numerical operation processing on this digital data in accordance with a program. Then, the determination unit JU is constituted so as to select the data to be output to the wireless communication unit RFU, on the basis of a result of the numerical operation processing in the numerical analysis unit NAU.

The data processing unit DPU is constituted as described above, and hereinafter, the operation thereof will be described. First, a physical quantity such as temperature, pressure, flow rate, light, or magnetism, is detected by the sensor SR, and a weak detection signal that is an analog signal is output from the sensor SR on the basis of this detection result. Then, the output weak detection signal is input to the sensing unit SU in the analog data processing unit ADPU. Subsequently, in the sensing unit SU, the input detection signal is amplified by the amplifier circuit. Moreover, when the detection signal is not a voltage signal but a current signal, the current signal is converted to a voltage signal by the transimpedance circuit. Furthermore, in order to remove the noise contained in the detection signal, the noise contained in the detection signal is removed by the filter circuit. In this way, in the sensing unit SU, analog data (an analog signal) is generated and output by processing the detection signal (analog signal) input from the sensor SR. Subsequently, the AD conversion unit ADU receives the analog data output from the sensing unit SU and converts the same to digital data. After that, the digital data converted by the AD conversion unit ADU is input to the numerical analysis unit NAU in the digital data processing unit DDPU. Subsequently, the numerical analysis unit NAU performs numerical operation processing on the basis of the input digital data, and then the determination unit JU selects the digital data to be output to the wireless communication unit RFU, on the basis of a result of the numerical operation processing. Next, the digital data output from the digital data processing unit DDPU is input to the wireless communication unit RFU and converted to a radio frequency signal, and is then transmitted from the antenna ANT1. In this way, in the node, the data based on a physical quantity detected by the sensor SR is created and a radio frequency signal corresponding to this data is transmitted.

Figure 4:
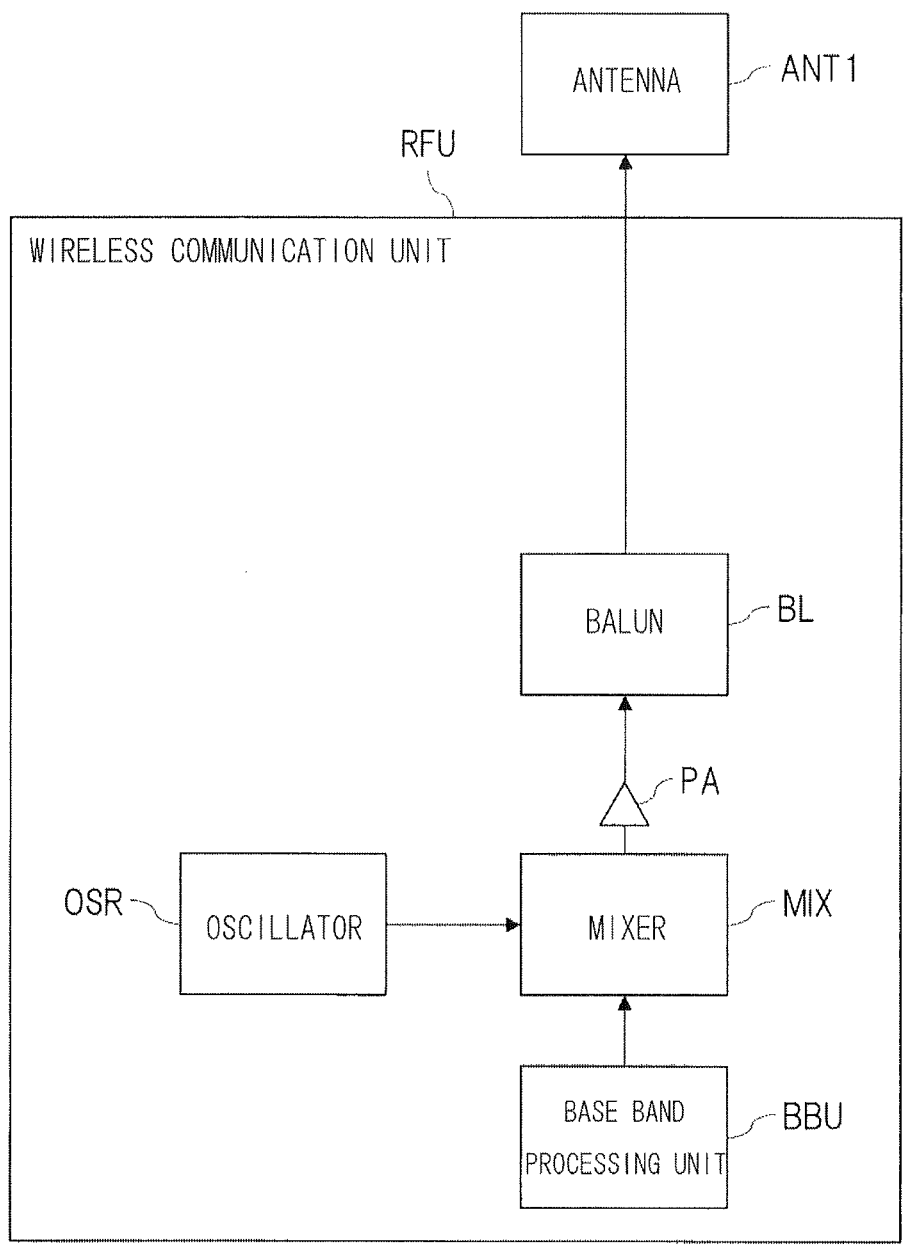
FIG. 4 is a block diagram illustrating a detailed configuration example of a transmission unit of a wireless communication unit included in the node.

Next, a detailed configuration example of the wireless communication unit RFU included in the node will be described. FIG. 4 is a block diagram illustrating a detailed configuration example of the transmission unit of the wireless communication unit RFU included in the node. In FIG. 4, the wireless communication unit RFU includes a baseband processing unit BBU, a mixer MIX, an oscillator OSR, a power amplifier PA, and a balun BL.

The baseband processing unit BBU is constituted so as to generate and process a baseband signal for modulation from the digital data input from the data processing unit, and the oscillator OSR is constituted so as to generate a radio frequency carrier wave. In addition, the mixer MIX is constituted so as to generate a radio frequency signal by superimposing the baseband signal generated by the baseband processing unit BBU onto a carrier wave generated by the oscillator OSR. Furthermore, the power amplifier PA is constituted so as to amplify the radio frequency signal output from the mixer MIX, and the balun BL is an element for converting a balanced electric signal to an unbalanced electric signal, and vice versa.

The transmission unit of the wireless communication unit RFU is constituted in this way, and hereinafter, the operation thereof will be described. First, the baseband processing unit BBU generates the baseband signal for modulation from the digital data input from the data processing unit. Then, this baseband signal and the carrier wave generated by the oscillator OSR are modulated by mixing with the mixer MIX and thus a radio frequency signal is generated. This radio frequency signal is amplified by the power amplifier PA, and is then output from the wireless communication unit RFU via the balun BL. Subsequently, the radio frequency signal output from the wireless communication unit RFU is transmitted from the antenna ANT1 electrically coupled to the wireless communication unit RFU. In this way, the radio frequency signal can be transmitted from the node.

Figure 5:
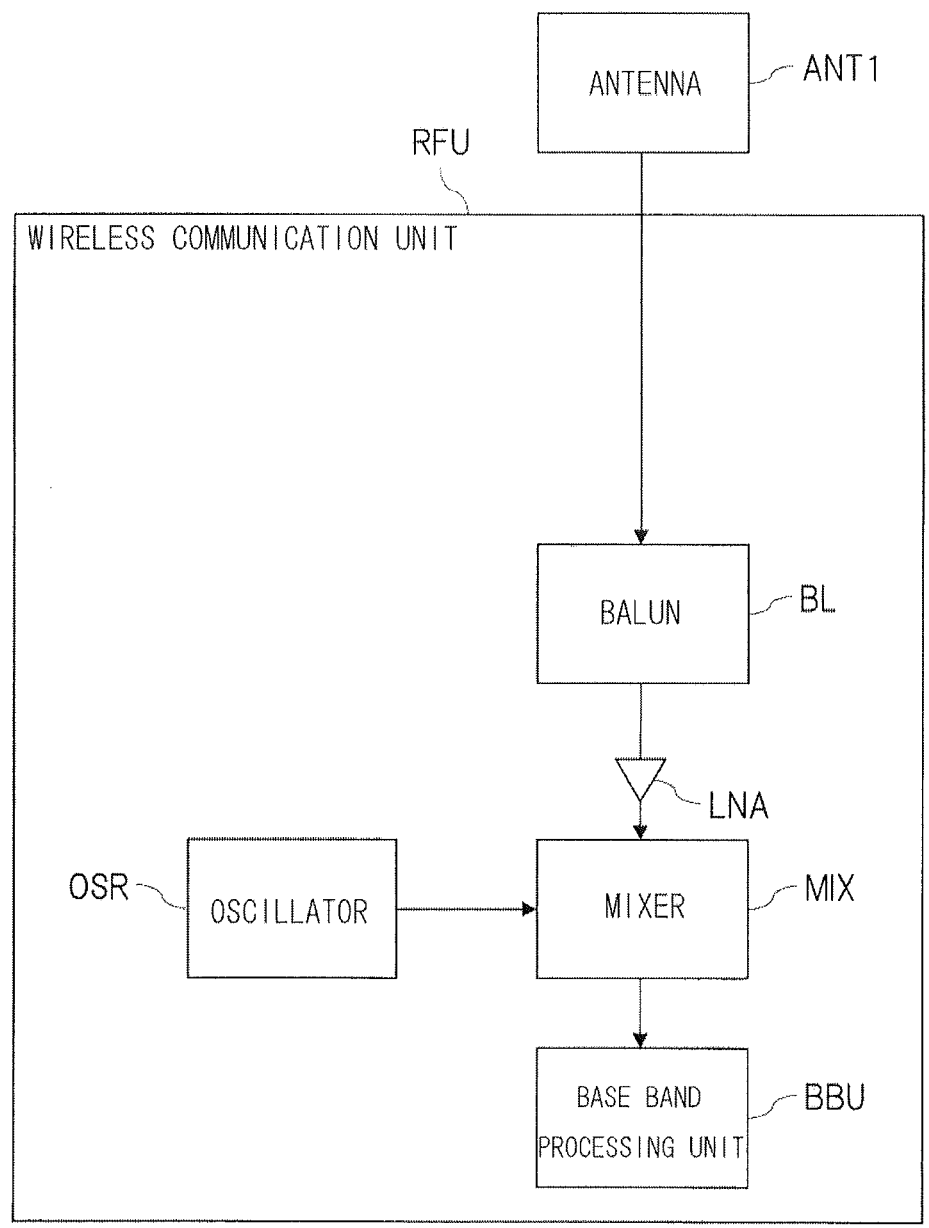
FIG. 5 is a block diagram illustrating a detailed configuration example of a reception unit of the wireless communication unit included in the node.

Next, FIG. 5 is a block diagram illustrating a detailed configuration example of the reception unit of the wireless communication unit RFU included in the node. In FIG. 5, the wireless communication unit RFU includes a baseband processing unit BBU, a mixer MIX, an oscillator OSR, a low noise amplifier LNA, and a balun BL.

The balun BL is an element for converting a balanced electric signal to an unbalanced electric signal, and vice versa. The low noise amplifier LNA is constituted so as to amplify a received weak reception signal. The oscillator OSR is constituted so as to generate a radio frequency carrier wave, and the mixer MIX is constituted so as to generate a baseband signal by superimposing the reception signal amplified by the low noise amplifier LNA onto a carrier wave generated by the oscillator OSR. The baseband processing unit BBU is constituted so as to generate and process digital data from a demodulated baseband signal.

The reception unit of the wireless communication unit RFU is constituted in this way, and hereinafter, the operation thereof will be described. First, a reception signal received by the antenna ANT1 is input to the low noise amplifier LNA via the balun BL, and is amplified there. Subsequently, the amplified reception signal is demodulated by being mixed using the mixer MIX, with the carrier wave which is generated by the oscillator OSR, to thereby generate the baseband signal. Then, the demodulated baseband signal is converted to digital data and processed, in the baseband processing unit BBU. In this way, a reception signal can be received at the node.

<External Configuration of Electronic Device in the First Embodiment>

Next, an external configuration of the electronic device EA1 in the first embodiment is described.

Figure 6:
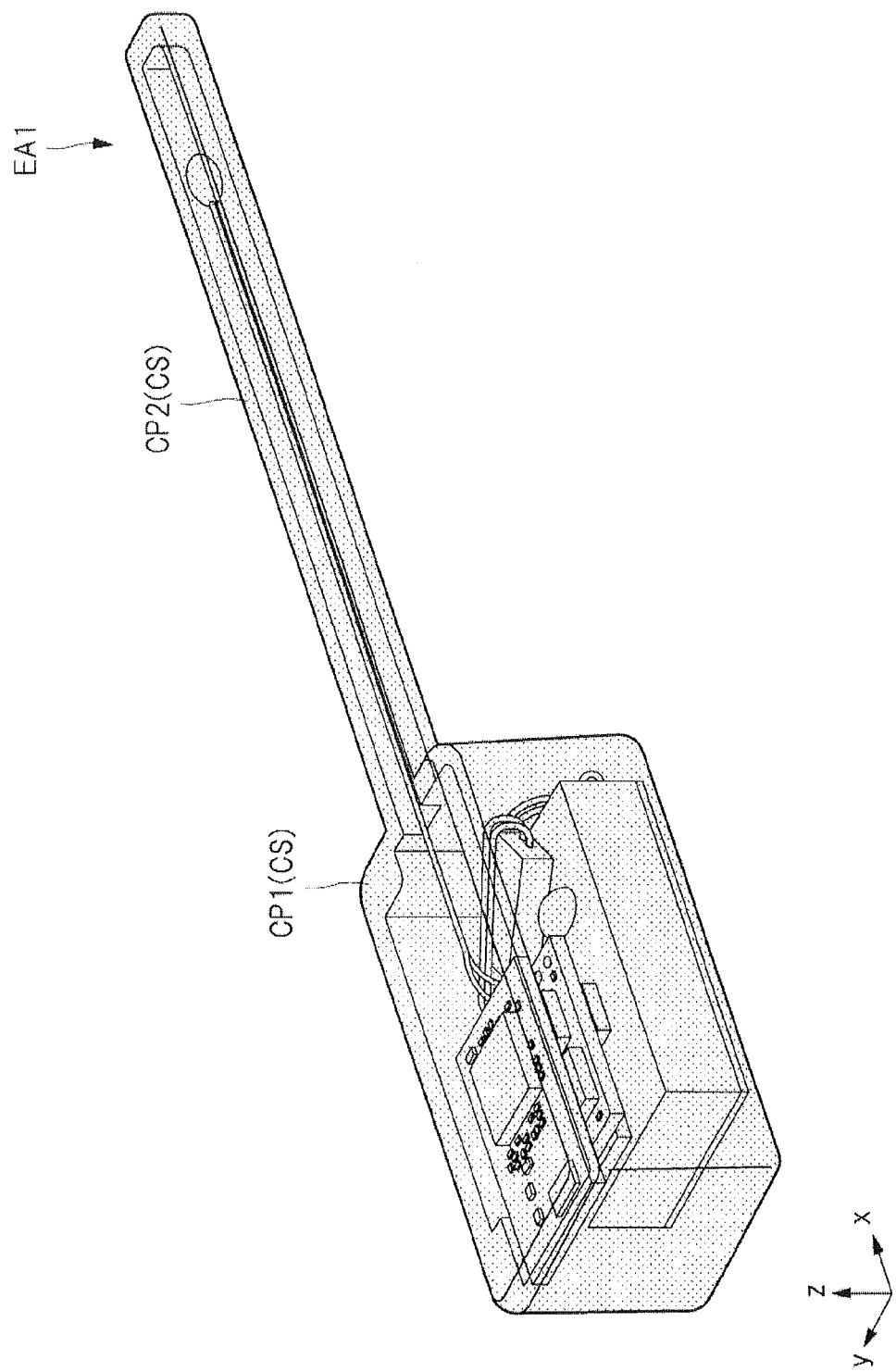
FIG. 6 is a perspective view illustrating the external configuration of an electronic device in a first embodiment.

FIG. 6 is a perspective view illustrating the external configuration of the electronic device EA1 in the first embodiment. As illustrated in FIG. 6, the electronic device EA1 in the first embodiment has a case CS, and the elements of the electronic device EA1 are housed inside the case CS. Note that the electronic device EA1 in the first embodiment does not necessarily need to have the case CS, and the elements of the electronic device EA1 may not be housed inside the case CS. However, here, the electronic device EA1 whose elements are housed inside the case CS will be taken as an example and described.

The case CS illustrated in FIG. 6 includes a volume part CP1 having a first space therein and a volume part CP2 having a second space therein. At this time, the respective volume part CP1 and volume part CP2 are sealed, respectively. Namely, the case CS is sealed.

Here, the volume part CP1 and volume part CP2 are integrally coupled to each other to constitute the case CS. The volume part CP1 has a substantially rectangular parallelepiped shape that is closer to a substantially cubic shape than the volume part CP2. On the other hand, the volume part CP2 has a substantially rectangular parallelepiped shape that is more elongated than the volume part CP1, and the elongated long-side of the volume part CP2 extends in, for example, the x direction.

The case CS in the first embodiment is constituted as described above, and the elements of the electronic device EA1 are housed inside the case CS.

<Mounting Configuration of Elements of Electronic Device>

Figure 7:
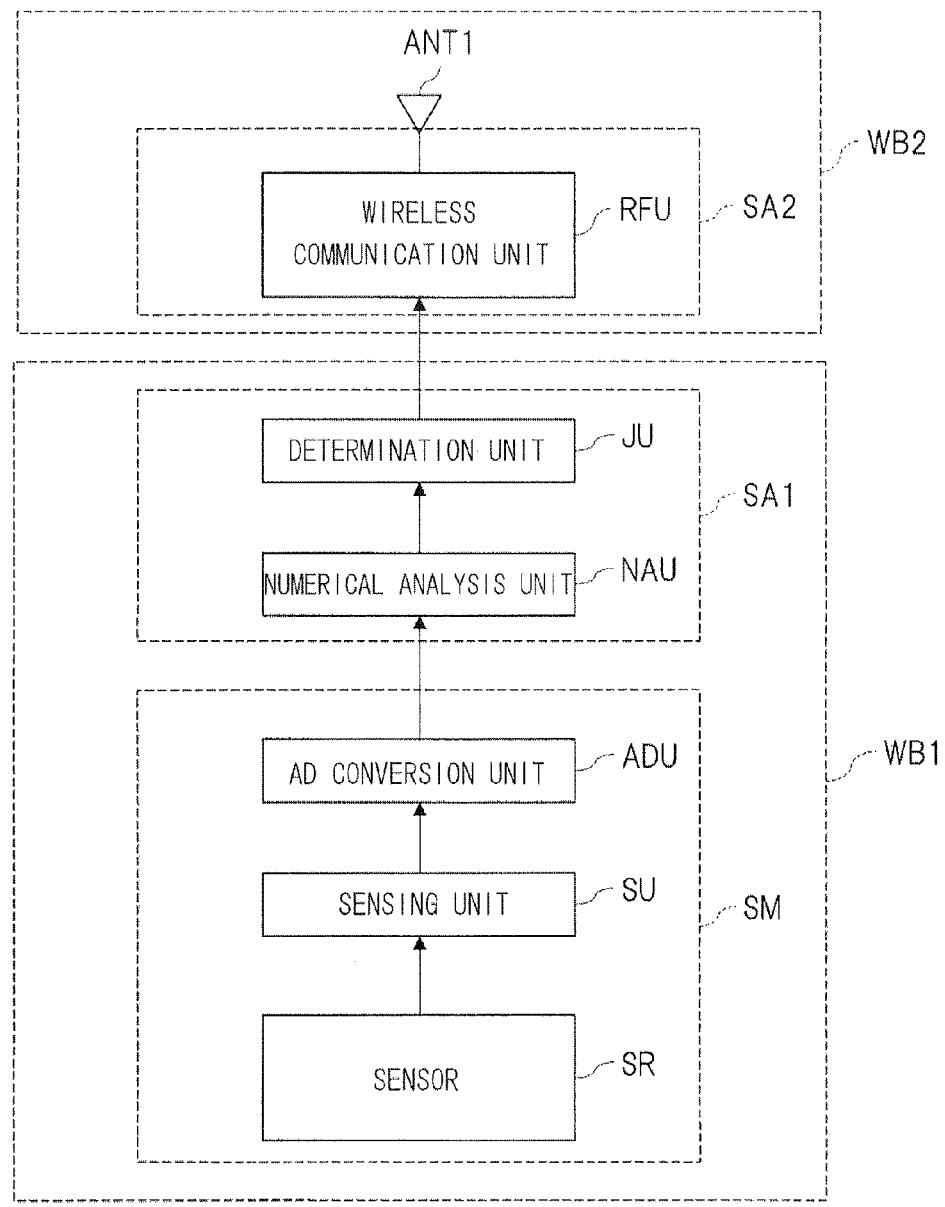
FIG. 7 illustrates a correspondence between the functional configuration and mounting components of the electronic device (node) in the first embodiment.

Hereinafter, the mounting configuration of the elements of the electronic device EA1 housed inside the case CS will be described. First, FIG. 7 illustrates a correspondence between the functional configuration and mounting components of the electronic device (node) EA1 in the first embodiment. In FIG. 7, in the first embodiment, sensor SR, sensing unit SU, and AD conversion unit ADU integrally constitute a sensor module SM. On the other hand, the numerical analysis unit NAU and the determination unit JU are formed in a semiconductor device SA1 that constitutes an MCU. Then, the sensor module SM and the semiconductor device SA1 are mounted in a common wiring board WB1.

In contrast, the wireless communication unit RFU and the antenna ANT1 are arranged in a wiring board WB2 that is a board separated from the wiring board WB1. Then, among the elements of the wireless communication unit RFU illustrated in FIG. 4 and FIG. 5, the baseband processing unit BBU, oscillator OSR, mixer MIX, power amplifier PA, and low noise amplifier LNA are formed in the semiconductor device SA2 constituting the MCU.

Figure 8:
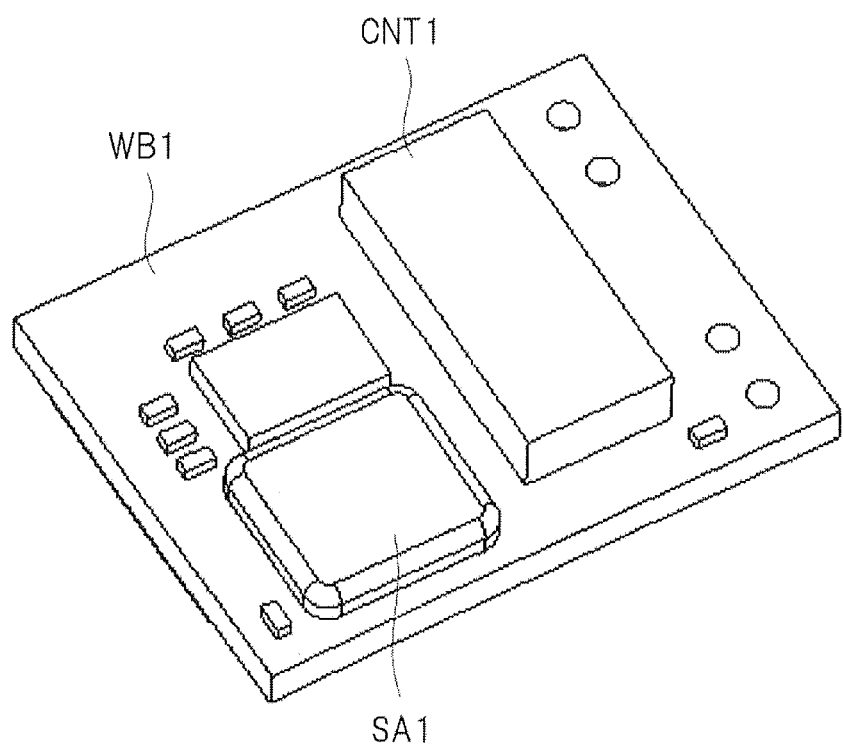
FIG. 8 is a perspective view schematically illustrating the mounting configuration of a wiring board having electronic components mounted therein.

Subsequently, FIG. 8 is a perspective view schematically illustrating the mounting configuration of the wiring board WB1 having electronic components mounted therein. As illustrated in FIG. 8, for example, a connector CNT1 and the semiconductor device SA1 are mounted on the surface (upper surface) of the wiring board WB1. In the semiconductor device SA1, an MCU for realizing the numerical analysis unit NAU and determination unit JU illustrated in FIG. 7 is formed. On the other hand, in FIG. 8, though not illustrated, for example, the sensor module SM including the sensor SR, sensing unit SU, and AD conversion unit ADU illustrated in FIG. 7 is arranged on the rear surface (lower surface) of the wiring board WB1. Namely, in the wiring board WB1 in the first embodiment, the electronic components are mounted on both of the front surface and rear surface.

Figure 9:
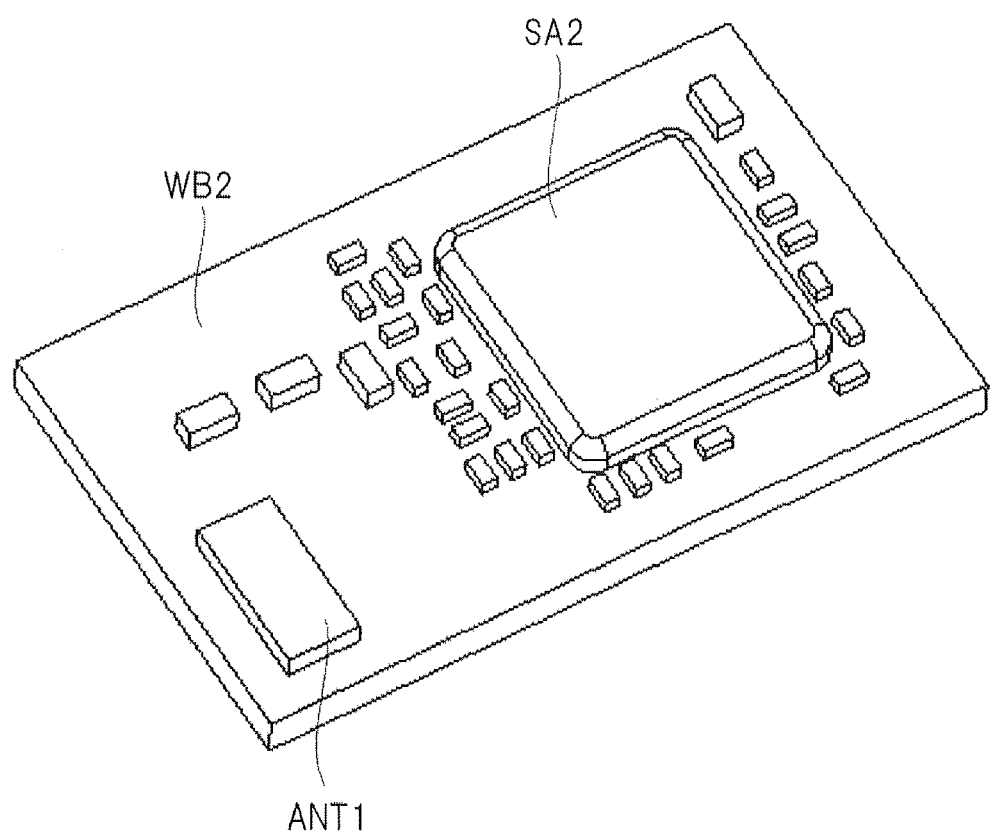
FIG. 9 is a perspective view schematically illustrating the mounting configuration of a wiring board having electronic components mounted therein.

Next, FIG. 9 is a perspective view schematically illustrating the mounting configuration of the wiring board WB2 having electronic components mounted therein. As illustrated in FIG. 9, in the front surface (upper surface) of the wiring board WB2, the antenna (antenna unit) ANT1 constituted of, for example, a chip antenna and the semiconductor device SA2 are mounted. Here, the antenna ANT1 can also be constituted of a pattern antenna instead of the chip antenna. The main elements of the wireless communication unit RFU illustrated in FIG. 7 are formed in the semiconductor device SA2. In this way, in the wiring board WB1, at least a sensor (sensor module SM) that detects a physical quantity is mounted, whereas in the wiring board WB2, at least the wireless communication unit RFU constituted to transmit the data based on an output signal from the sensor is mounted. Accordingly, the module unit including the sensor module SM and the wireless communication unit RFU has the wiring board WB1 illustrated in FIG. 8 and the wiring board WB2 illustrated in FIG. 9. Hereinafter, the mounting configuration of this module unit will be described with reference to the accompanying drawings.

<Mounting Configuration of Module Unit>

FIG. 10 illustrates a mounting configuration of the module unit MJU1 in the first embodiment. Specifically, FIG. 10A is a perspective view illustrating the mounting configuration of the module unit MJU1 in the first embodiment, and FIG. 10B is a side view illustrating the mounting configuration of the module unit MJU1 in the first embodiment.

First, as illustrated in FIG. 10A, the module unit MJU1 in the first embodiment is constituted of a stacked structure of the wiring board WB1 illustrated in FIG. 8 and the wiring board WB2 illustrated in FIG. 9. For example, the module unit MJU1 in the first embodiment is constituted of the wiring board WB1 arranged in a lower portion and the wiring board WB2 arranged in the upper portion of the wiring board WB1.

Specifically, as illustrated in FIG. 10B, in the wiring board WB1, other electronic components together with the sensor module SM including the sensor are mounted on the rear surface of the wiring board WB1. On the other hand, electronic components including the semiconductor device SA1 in addition to the connector CNT1 are mounted on the front surface of the wiring board WB1. In contrast, in the wiring board WB2, a socket for inserting the connector CNT1 is formed on the rear surface of the wiring board WB2, for example. As a result, the wiring board WB1 and the wiring board WB2 can be electrically and physically coupled to each other by inserting the connector CNT1 formed on the front surface of the wiring board WB1 that is arranged under the wiring board WB2, into the socket formed on the rear surface of the wiring board WB2 that is arranged above the wiring board WB1. Furthermore, the wiring board WB1 and the wiring board WB2 are physically coupled to each other also with an adhesive material ADH1. Then, an electronic device including the antenna ANT1 and the semiconductor device SA2 is mounted on the front surface of the wiring board WB2. The module unit MJU1 in the first embodiment is formed in this way.

In the module unit MJU1 in the first embodiment constituted in this way, the wireless communication unit RFU and sensor module SM in the module unit MJU1 are separated from each other in the mounting configuration. Namely, in the first embodiment, the module unit MJU1 is constituted of the wiring board WB1 and wiring board WB2 different from each other. The sensor module SM is realized by the electronic components (mounting components) mounted in the wiring board WB1 and the wireless communication unit RFU is realized by the electronic components (mounting components) mounted in the wiring board WB2.

Hereinafter, there will be described the advantage by being constituted in such a manner that the wireless communication unit RFU and sensor module SM included in the module unit MJU1 are separated in the mounting configuration. For example, when the wireless communication unit RFU and the sensor module SM integrally constitute a module unit in the mounting configuration, a radio wave certificate needs to be acquired for each module unit with a different sensor, resulting in the increase in the manufacturing cost of the module unit.

In contrast, as with the module unit MJU1 in the first embodiment, when the wireless communication unit RFU and the sensor module SM are separated from each other in the mounting configuration, only the sensor module SM can be customized, with the wireless communication unit RFU whose radio wave certificate has been acquired being used as the common component. Namely, the wiring board WB2 having the wireless communication unit RFU formed therein can be made common, and thus, even when the configuration of the sensor module SM differs, the radio wave certificate does not need to be acquired for each module unit with a different type of sensor and the manufacturing cost of the whole module unit can be reduced. In particular, the mounting configuration of the wiring board WB2 in which the wireless communication unit RFU is formed is made common and only the mounting configuration of the wiring board WB1 in which the sensor module SM is formed is customized, and thus the module unit MJU1 corresponding to a different type of sensor can be constituted. Therefore, the versatility in driving the common use of the mounting components constituting the module unit MJU1 can be enhanced, and the manufacturing cost of the module unit MJU1 can be reduced also from this viewpoint. Namely, according to the separating configuration of the module unit MJU1 in the first embodiment, there can be obtained a remarkable effect of being able to significantly reduce the manufacturing cost of the module unit MJU1 due to ease of acquisition of a radio wave certificate by making the wireless communication unit RFU common and due to improvement in the versatility by making the mounting components common.

Next, in the module unit MJU1 in the first embodiment, the wiring board WB1 and the wiring board WB2 are arranged by being stacked in the thickness direction of the boards. Therefore, the plane size of the whole module unit MJU1 can be reduced. For example, when the wireless communication unit RFU and the sensor module SM are integrally arranged over one wiring board, the number of the mounting components mounted over one wiring board also increases and accordingly the plane size of the wiring board increases and the plane size of the whole module unit increases.

In contrast, as with the module unit MJU1 in the first embodiment, when the wiring board WB2 having the wireless communication unit RFU and antenna ANT1 arranged therein is stacked over the wiring board WB1 having the sensor module SM arranged therein, the number of the mounting components mounted in the wiring board WB1 or wiring board WB2 also decreases. As a result, the plane size of the wiring board WB1 and wiring board WB2 can be reduced. Then, the plane size of the whole module unit MJU1 is significantly reduced by stacking the wiring board WB2 over the wiring board WB1. As a result, according to the module unit MJU1 in the first embodiment, the reduction in size of the whole module unit MJU1 including the wiring board WB1 and the wiring board WB2 can be achieved.

Furthermore, in the first embodiment, the wiring board WB1 and the wiring board WB2 are coupled by the connector CNT1. In this case, the wiring board WB1 and the wiring board WB2 are detachable. For this reason, for example, when a failure occurs in the wireless communication unit RFU that is realized by the mounting components mounted in the wiring board WB2 arranged in the upper layer, it becomes easy to remove the wiring board WB2 in which a failure has occurred, from the wiring board WB1. Then, in place of the wiring board WB2 in which a failure has occurred, a non-defective wiring board WB2 is coupled to the wiring board WB1, and thus the module can be used as a non-defective module without any problem. Note that, in the first embodiment, the wiring board WB1 and the wiring board WB2 adhere to each other not only by the connector CNT1 but also with the adhesive material ADH1, in order to improve the coupling strength between the wiring board WB1 and the wiring board WB2. In this case, it is considered that the detachability between the wiring board WB1 and the wiring board WB2 is sacrificed. However, the improvement in the coupling strength between the wiring board WB1 and the wiring board WB2 can be achieved without sacrificing the detachability between the wiring board WB1 and the wiring board WB2, through the use of the quality of material that can be easily peeled off of, for example, a silicone-based adhesive material or the like as the adhesive material ADH1.

<Mounting Configuration of Whole Electronic Device Housed Inside Case>

Figure 11:
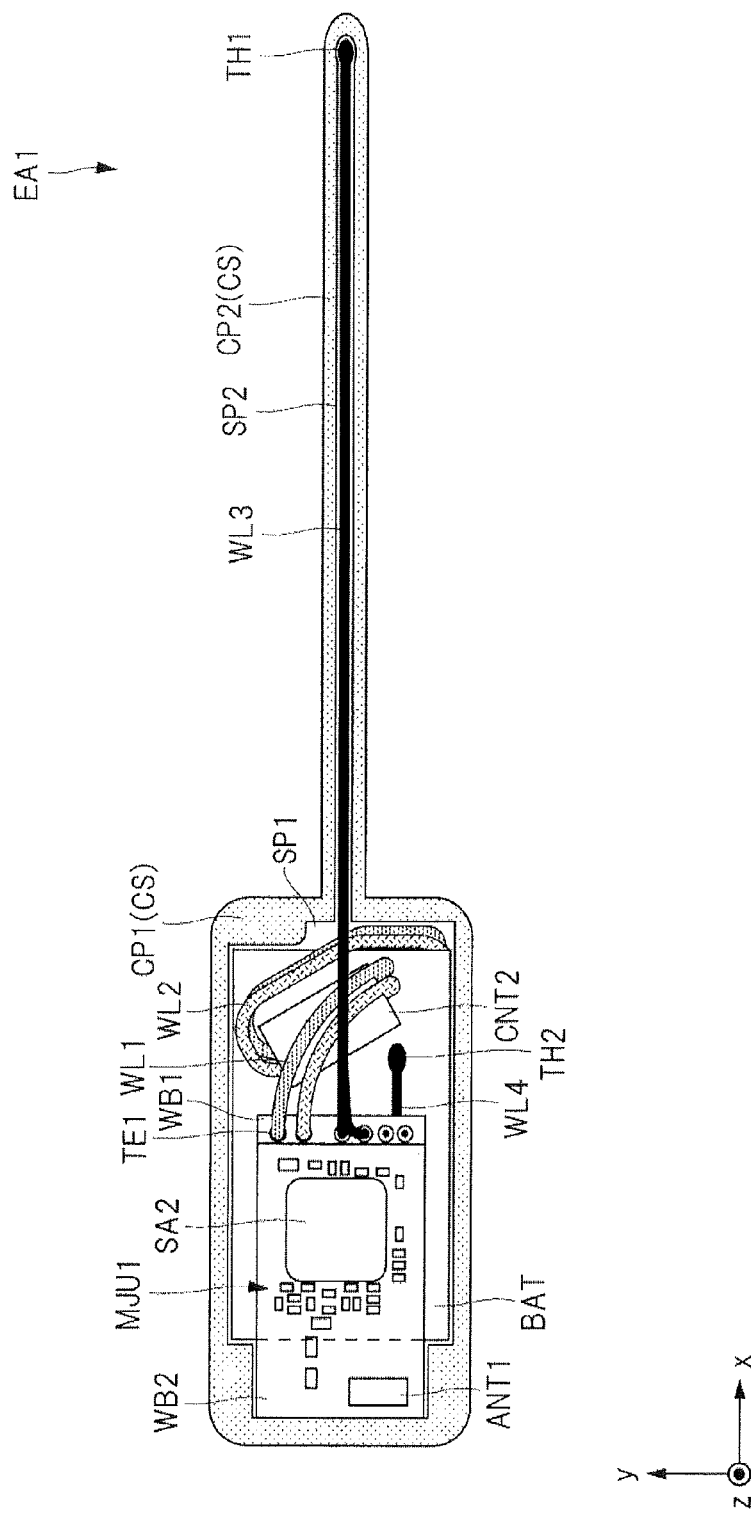
FIG. 11 is a schematic perspective top view illustrating the mounting configuration of the electronic device in the first embodiment.
Figure 12:
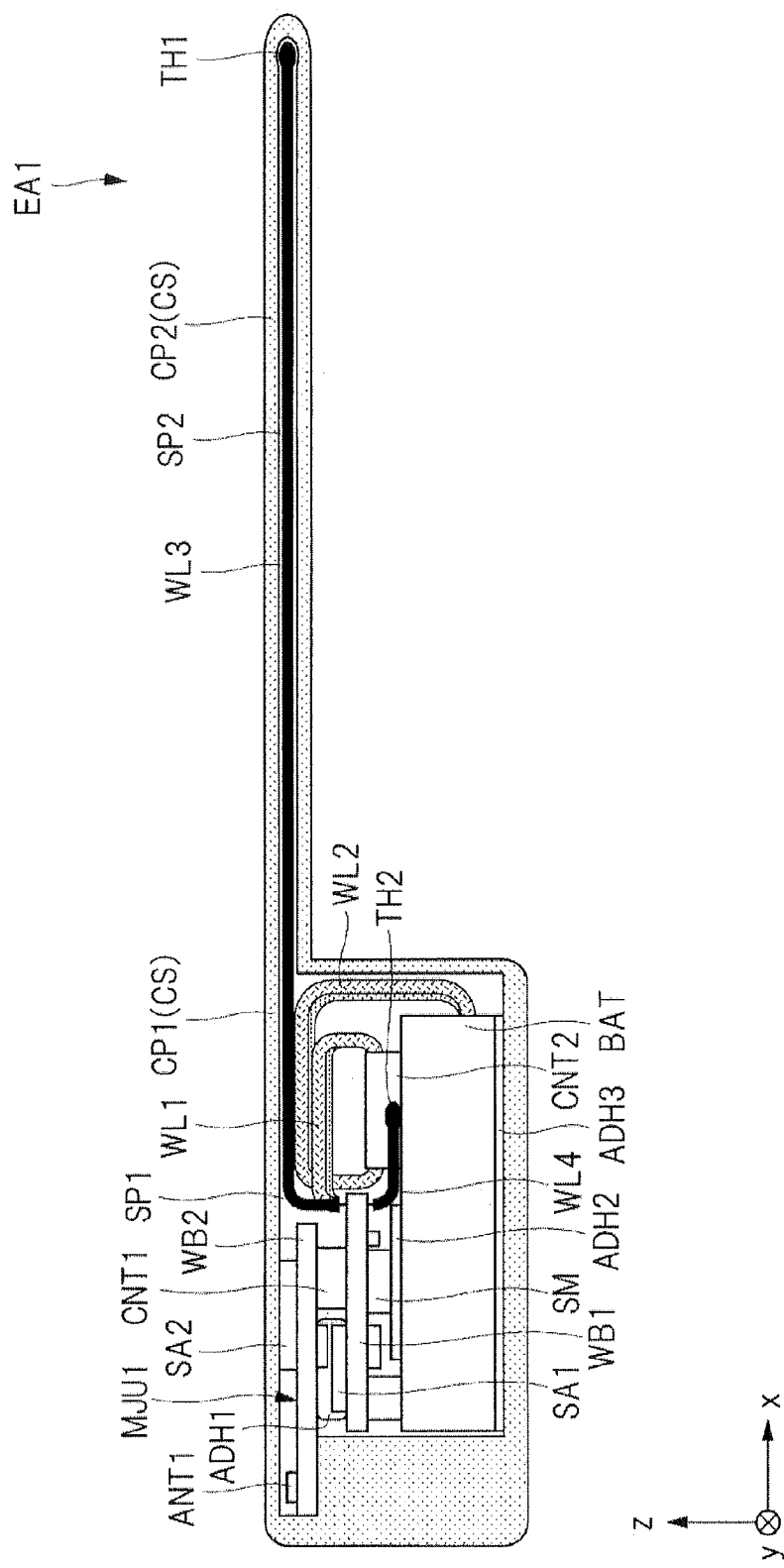
FIG. 12 is a schematic perspective side view illustrating the mounting configuration of the electronic device in the first embodiment.

Next, the mounting configuration of the whole electronic device EA1 housed inside the case CS will be described. FIG. 11 is a schematic perspective top view illustrating the mounting configuration of the electronic device EA1 in the first embodiment. FIG. 12 is a schematic perspective side view illustrating the mounting configuration of the electronic device EA1 in the first embodiment.

In FIG. 11 and FIG. 12, in a space SP1 inside the volume part CP1 constituting a part of the case CS, the module unit MJU1 constituted of a stacked structure of the wiring board WB1 and the wiring board WB2, a battery BAT, and a coupling part that electrically couples the module unit MJU1 and the battery BAT are housed. For example, in the first embodiment, as illustrated in FIG. 12, the battery BAT is arranged above the bottom of the volume part CP1. Then, the wring board WB1 is arranged over the battery BAT, and the wiring board WB2 is arranged above the wiring board WB1. Moreover, the coupling part is arranged over the battery BAT. At this time, the coupling part is constituted of a wiring WL1 that couples the connector CNT2 and the wiring board WB1 of the module unit MJU1 and a wiring WL2 that couples the connector CNT2 and the battery BAT, for example. Furthermore, a thermistor TH2 for measuring the temperature of the battery BAT and a wiring WL4 to be electrically coupled to the thermistor TH2 are arranged over the battery BAT, and the wiring WL4 is coupled to the wiring board WB1.

Note that a rechargeable secondary battery is used as the battery BAT in the first embodiment, and the examples of the secondary battery include a lithium ion battery. In addition, for example, an electric double layer capacitor or the like can be used as the rechargeable secondary battery. Namely, the "secondary battery" referred to herein is used in a broad concept including a chargeable and dischargeable storage device, and the "secondary battery" referred to herein also includes an electric double layer capacitor.

On the other hand, in the case CS in the first embodiment, the volume part CP2 is provided so as to be coupled to the volume part CP1, and the thermistor TH1 that is a temperature sensor and a wiring WL3 to be electrically coupled to the thermistor TH1 are housed in a space SP2 inside the volume part CP2. In addition, the space SP1 inside the volume part CP1 and the space SP2 inside the volume part CP2 communicate with each other, and the wiring WL3 coupled to the thermistor TH1 is coupled to the wiring board WB1 of the module unit MJU1. The thermistor TH1 housed in the space SP2 inside the volume part CP2 has a function of measuring the temperature of the external environment in which, for example, the electronic device EA1 is installed.

As described above, the electronic device EA1 in the first embodiment includes the thermistor TH1 and thermistor TH2 as a temperature sensor, but this configuration is just an example. For example, the electronic device EA1 may include only any one of the thermistor TH1 and thermistor TH2 or alternatively may be constituted so as not to include both of the thermistor TH1 and the thermistor TH2.

The electronic device EA1 in the first embodiment constituted as described above is the electronic device serving as an element (node) of a wireless communication system. The electronic device EA1 includes the module unit MJU1, the battery BAT that supplies electric power to the module unit MJU1, and the coupling part that electrically couples the module unit MJU1 and the battery BAT. At this time, the module unit MJU1 includes a sensor that detects a physical quantity and a wireless communication unit configured to transmit the data based on an output signal from the sensor.

<Features in First Embodiment>

The electronic device EA1 in the first embodiment is constituted as described above, and hereinafter, the feature points thereof will be described.

A first feature point in the first embodiment consists in that the module unit MJU1 and the battery BAT are integrally provided as illustrated in, for example, FIG. 11 and FIG. 12. Therefore, according to the first embodiment, the reduction in size of the whole electronic device EA1 can be achieved.

For example, the reduction in size of the module unit MJU1 itself can be considered, but the actual electronic device EA1 needs not only the module unit MJU1 but also the battery BAT that supplies electric power to the module unit MJU1. For this reason, even if the reduction in size of the module unit MJU1 itself is achieved, if the electronic device including the battery BAT is constituted, then as a result, the reduction in size of the whole electronic device combining the module unit MJU1 and the battery BAT cannot be achieved. Regarding this point, in the first embodiment, on the assumption that the module unit MJU1 and the battery BAT are combined, an integral structure of the module unit MJU1 and battery BAT capable of achieving the reduction in size of the whole electronic device EA1 is realized. Therefore, according to the first embodiment, the reduction in size of the whole electronic device EA1 combining the module unit MJU1 and the battery BAT can be achieved. In particular, in the first embodiment, as illustrated in FIG. 11 and FIG. 12, the module unit MJU1 and the battery BAT are stacked and arranged. Specifically, the module unit MJU1 is arranged over the battery BAT. Thereby, according to the electronic device EA1 in the first embodiment, the whole plane area (footprint) of a combination of the module unit MJU1 and the battery BAT can be reduced. As a result, according to the first embodiment, the reduction in size of the whole electronic device EA1 can be achieved.

Furthermore, in the first embodiment, the electronic device EA1 is devised from the viewpoint of achieving the reduction in size of the whole electronic device EA1, and the points devised include a second feature point and third feature point in the first embodiment. Hereinafter, these second feature point and third feature point will be described.

The second feature point in the first embodiment consists in that electronic components are mounted on both surfaces of the wiring board WB1 that constitutes a part of the module unit MJU1*as* as illustrated in, for example, FIG. 12. Specifically, as illustrated in FIG. 12, electronic components including the sensor module SM are mounted on the lower surface (rear surface) of the wiring board WB1, while on the upper surface (front surface) of the wiring board WB1, electronic components including the semiconductor device SA1 are mounted. Therefore, according to the first embodiment, the plane size of the wiring board WB1 can be reduced as compared with a case where the electronic components including the sensor module SM and semiconductor device SA1 are mounted on one side of the wiring board WB1. Being capable of reducing the plane size of the wiring board WB1 means achieving the reduction in size of the module unit MJU1 including the wiring board WB1, and thus the reduction in size of the whole electronic device EA1 including the module unit MJU1 and the battery BAT can be achieved.

In addition, the third feature point in the first embodiment consists in that above the battery BAT, not only the module unit MJU1 is arranged but also the coupling part that couples the module unit MJU1 and the battery BAT is arranged as illustrated in, for example, FIG. 11 and FIG. 12. Namely, the third feature point in the first embodiment consists in that not only the battery BAT and module unit MJU1 are stacked but also the battery BAT and coupling part are stacked, from the viewpoint of reducing the whole plane area of the combination of the battery BAT, module unit MJU1, and coupling part. Namely, in the first embodiment, the upper surface of the battery BAT has an area in which the module unit MJU1 is mounted and an area in which the coupling part is mounted. In other words, the upper surface of the battery BAT has an area (a first area) that planarly overlaps with the wiring board WB1 or wiring board WB2 and an area (a second area) that does not planarly overlap with the wiring board WB1 and wiring board WB2, and the coupling part is provided in the area that does not planarly overlap with the wiring board WB1 and wiring board WB2.

Therefore, according to the electronic device EA1 in the first embodiment, the reduction in size of the whole combination of the battery BAT, module unit MJU1, and coupling part can be achieved as compared with a case where only the module unit MJU1 is arranged over the battery BAT. From the above, according to the first embodiment, the reduction in size of the whole electronic device EA1 can be promoted by further having the second feature point and third feature point, with the first feature point as the basic idea.

Subsequently, a fourth feature point in the first embodiment consists in that the wiring board WB1 and wiring board WB2 constituting the module unit MJU1 are arranged planarly shifting from each other as illustrated in, for example, FIG. 11 and FIG. 12. Specifically, as illustrated in FIG. 10, the upper surface of the wiring board WB1 has an overlapping area DP1 that planarly overlaps with the wiring board WB2 and a non-overlapping area NDP1 that does not planarly overlap with the wiring board WB2. On the other hand, the upper surface of the wiring board WB2 has an overlapping area DP2 that planarly overlaps with the wiring board WB1 and a non-overlapping area NDP2 that does not planarly overlap with the wiring board WB1. At this time, the formation direction (the right relative to FIG. 10) of the non-overlapping area NDP1 with respect to the overlapping area DP1 and the formation direction (the left relative to FIG. 10) of the non-overlapping area NDP2 with respect to the overlapping area DP2 are opposite to each other.

In addition, in the first embodiment as illustrated in, for example, FIG. 10, the antenna ANT1 is provided in the non-overlapping area NDP2 of the wiring board WB2, whereas other electronic components are provided in areas other than the non-overlapping area NDP2. However, the general meaning of "other electronic components are provided in areas other than the non-overlapping area NDP2" basically assumes that a configuration is preferable in which neither the electronic components other than the antenna ANT1 mounted in the wiring board WB2 nor the electronic components and the like mounted in the wiring board WB1 are arranged so as not to overlap with the non-overlapping area NDP2, for example, but not strictly limited to the configuration in which other electronic components do not protrude to the non-overlapping area NDP2 side. Namely, the expression "other electronic components are provided in areas other than the non-overlapping area NDP2" referred to herein does not exclude the cases where a part of other electronic components slightly overlaps with the non-overlapping area NDP2. When it is interpreted that the technical idea of "other electronic components are provided in areas other than the non-overlapping area NDP2" is generally realized, even the cases where a part of other electronic components slightly overlaps with the non-overlapping area NDP2 are included in the concept "other electronic components are provided in areas other than the non-overlapping area NDP2" referred to herein.

As described above, the fourth feature point in the first embodiment consists in that neither conductor pattern (metallic pattern) nor electronic component is preferably arranged in the periphery of the antenna ANT1. Namely, in a plan view, the antenna ANT1 is provided at a position of not overlapping with the electronic components that are the elements of the module unit MJU1 represented by the sensor module SM or the connector CNT1. Therefore, according to the first embodiment, the characteristic of the antenna ANT1 can be improved. As a result, the communication distance of the electronic device EA1 can be increased. Namely, if there are a conductor pattern and/or electronic component in the periphery of the antenna ANT1, the characteristics of the antenna ANT1 significantly degrade due to an electromagnetic wave shielding effect caused by the conductor pattern and/or electronic component. This is the reason why, in the first embodiment, neither conductor pattern nor electronic component is preferably arranged in the periphery of the antenna ANT1.

From the above, according to the fourth feature point in the first embodiment, the characteristics of the antenna ANT1 can be improved, and thus the communication distance of the electronic device EA1 (node) can be increased. This means that the option for selection of a communication path in the wireless sensor network is expanded. Namely, even if a communication path between adjacent nodes becomes unusable due to a communication failure caused by the increase in the communication distance of a node, a communication path between the node and a remote node can be secured. Therefore, a wireless sensor network less affected by a communication failure can be constructed by using the electronic device EA1 in the first embodiment at a node of the wireless sensor network.

Furthermore, as illustrated in FIG. 11 and FIG. 12, in a plan view, the antenna ANT1 is arranged so as not to overlap with the battery BAT, either. Thus, the antenna ANT1 is arranged so as not to overlap not only with electronic components that are the elements of the module unit MJU1 but also with the battery BAT arranged integrally with the module unit MJU1. As a result, according to the first embodiment, the characteristic of the antenna ANT1 can be improved.

The reduction in size of the electronic device EA1 in the first embodiment is achieved by integrally stacking the module unit MJU1 and the battery BAT according to the above-described first feature point. For this reason, it cannot be said that only arrangement of the antenna ANT1 so as not to planarly overlap with other electronic components of the module unit MJU1 is sufficient from the viewpoint of improving the characteristic of the antenna ANT1. Here is the reason: the battery BAT integrally stacked with the module unit MJU1 also includes a conductor, and thus, even if other conductor patterns and/or electronic components constituting the module unit MJU1 are planarly separated from the antenna ANT1, the characteristics of the antenna ANT1 are significantly affected by the battery BAT when there is a planar overlap between the antenna ANT1 and the battery BAT, with the result that the characteristic of the antenna ANT1 is likely to be deteriorated.

Therefore, in the first embodiment, also in a plan view, the antenna ANT1 is provided at a position of not overlapping with the electronic components and/or conductor pattern that are the elements of the module unit MJU1 and also at a position of not overlapping with the battery BAT. This is the fourth feature point in the first embodiment. The characteristics of the antenna ANT1 can also be improved by the fourth feature point while achieving the reduction in size of the electronic device EA1 by the above-described first feature point to third feature point.

Next, a fifth feature point in the first embodiment consists in the point that the coupling part that couples the module unit MJU1 and the battery BAT includes a removable connector CNT2 as illustrated in FIG. 11 and FIG. 12. Specifically, the coupling part that couples the module unit MJU1 and the battery BAT is constituted of a wiring WL1 that electrically couples the wiring board WB1 of the module unit MJU1 and the removable connector CNT2 and a wiring WL2 that electrically couples the removable connector CNT2 and the battery BAT. Therefore, the module unit MJU1 and the battery BAT can be separated by detaching the connector CNT2. As described above, in the first embodiment, the module unit MJU1 and the battery BAT are constituted to be able to be separated via the connector CNT2, and this configuration provides the following advantages.

For example, there is considered a case where the module unit MJU1 and the battery BAT are directly coupled by a wiring without via a connector. When the battery BAT is constituted of a rechargeable secondary battery and charged, in a configuration in which the module unit MJU1 and the battery BAT are directly coupled by a wiring without via a connector, the battery BAT needs to be charged by, for example, detaching wiring coupled by soldering. When the battery BAT is charged, after the charging of the battery BAT is completed by detaching the wiring coupled by soldering, the wiring needs to be coupled by soldering again. Accordingly, in a configuration in which the module unit MJU1 and the battery BAT are directly coupled by a wiring without via a connector, the charging work of the battery BAT becomes complicated.

In contrast, in the case where the module unit MJU1 and the battery BAT are coupled via the removable connector CNT2 as with the embodiment 1, the connector CNT2 is detached to charge the battery BAT and after the charging of the battery BAT is completed, the module unit MJU1 and the battery BAT can be electrically coupled again just by coupling the connector CNT2. Namely, in the first embodiment, the fifth feature point in which the module unit MJU1 and the battery BAT are coupled via the removable connector CNT2 simplifies the separation (detachment) between the module unit MJU1 and the battery BAT. This means that the charging of the battery BAT is facilitated, and thus, according to the first embodiment, the charging work of the battery BAT can be simplified.

Furthermore, on the premise of the above-described fifth feature point, a sixth feature point in the first embodiment consists in the point that the wiring WL1 that electrically couples the wiring board WB1 and the removable connector CNT2 bypasses and couples the wiring board WB1 and the connector CNT2 at a distance longer than the shortest connectable distance. Similarly, the sixth feature point in the first embodiment consists in in the point that the wiring WL2 that electrically couples the removable connector CNT2 and the battery BAT bypasses and couples the battery BAT and the connector CNT2 at a distance longer than the shortest connectable distance. Therefore, there is generated a margin for the length of the wiring WL1 and for the length of the wiring WL2, respectively, and thus the attachment/detachment work of the connector CNT2 can be advantageously facilitated.

For example, when the length of the wiring WL1 and the length of the wiring WL2 are set to a length of approximately the shortest connectable distance, the attachment/detachment work of the connector CNT2 tends to be inhibited by the wiring WL1 and/or wiring WL2. Namely, the attachment/detachment work of the connector CNT2 is likely to be constrained. In contrast, according to the sixth feature point of the first embodiment, the length of the wiring WL1 and/or length of the wiring WL2 is increased and as a result, the attachment/detachment work of the connector CNT2 is unlikely to be constrained and the attachment/detachment work of the connector CNT2 is facilitated. From the above, due to a synergistic effect of the above-described fifth feature point and sixth feature point, the workability in charging the battery BAT can be enhanced according to the electronic device EA1 in the first embodiment. Furthermore, the workability in replacing the battery BAT with a new battery can be also enhanced while re-using the module unit MJU1.

Next, a seventh feature point in the first embodiment consists in the point that a joining portion between the module unit MJU1 and the coupling part is formed in the non-overlapping area NDP1 of the wiring board WB1 illustrated in, for example, FIG. 10. Specifically, as illustrated in FIG. 10 and FIG. 11, a terminal TE1 having a penetrating structure of penetrating through the wiring board WB1 is formed in the non-overlapping area NDP1 of the wiring board WB1, and the joining portion between the wiring board WB1 (module unit MJU1) and the wiring WL1 (coupling part) is formed by insertion of the wiring WL1 into the terminal TE1 having a penetrating structure and by solder joining. Similarly, as illustrated in FIG. 11 and FIG. 12, not only the wiring WL1 but also the wiring WL3 electrically coupled to the thermistor TH1 and the wiring WL4 electrically coupled to the thermistor TH2 are inserted into the terminal TE1 having a penetrating structure formed in the non-overlapping area NDP1 of the wiring board WB1 to thereby form a joining portion.

According to the seventh feature point, the following advantage can be obtained. First, the joining portion that couples the wiring board WB1 and the wiring WL1 is formed in the non-overlapping area NDP1 (see FIG. 10) of the wiring board WB1 most distant from the non-overlapping area NDP2 (see FIG. 10) of the wiring board WB2 in which the antenna ANT1 is arranged. As a result, according to the first embodiment, the characteristics of the antenna ANT1 are unlikely to be affected by the joining portion that couples the wiring board WB1 and the wiring WL1, and thus the characteristics of the antenna ANT1 formed in the non-overlapping area NDP2 (see FIG. 10) can be improved.

Moreover, the joining portion is formed by insertion of the wiring WL1 into the terminal TE1 having a penetrating structure formed in the wiring board WB1 and by solder joining. Therefore, for example, as compared with a case where the wiring WL1 is joined, by soldering, to a pad formed on the surface of the wiring board WB1 to thereby form the joining portion, the joining strength between the wiring board WB1 and the wiring WL1 can be enhanced by a space for the wiring WL1 being inserted into the terminal TE1 having a penetrating structure. Similarly, according to the seventh feature point in the first embodiment, the joining strength between the wiring board WB1 and the wiring WL3 and the joining strength between the wiring board WB1 and the wiring WL4 can be enhanced.

Furthermore, the advantages obtained from the fact that the joining portion between the module unit MJU1 and the coupling part is formed in the non-overlapping area NDP1 of the wiring board WB1 illustrated in FIG. 10 include the fact that soldering of the joining portion is facilitated even after stacking and arranging the wiring board WB1 and the wiring board WB2 (after performing stacking assembly).

Next, an eighth feature point in the first embodiment consists in point that for example as illustrated in FIG. 11 and FIG. 12, the elements of the electronic device EA1 are housed inside the case CS and that this case CS is sealed. Therefore, a waterproof property and/or dustproof property of the electronic device EA1 in the first embodiment can be enhanced.

Subsequently, a ninth feature point in the first embodiment consists in the point that as illustrated in FIG. 11 and FIG. 12 the space SP1 is provided inside the volume part CP1 and that the module unit MJU1, battery BAT, and coupling part are housed in the space SP1.

For example, it is considered that the module unit MJU1, battery BAT, and coupling part is covered with a packing material without providing the space SP1 inside the volume part CP1. However, in this case, the module unit MJU1 and/or battery BAT are difficult to be extracted from the electronic device EA1. This means that in the configuration in which the module unit MJU1 and/or battery BAT are covered with a packing material, the module unit MJU1 and/or battery BAT are difficult to be reused and/or repaired.

In contrast, according to the ninth feature point in the first embodiment, the module unit MJU1, battery BAT, and coupling part are housed in the space SP1 provided inside the volume part CP1. In this case, advantageously, the module unit MJU1 and/or battery BAT are easily extracted from the electronic device EA1, and the module unit MJU1 and/or battery BAT are easily reused and/or repaired, and/or a failure of the module unit MJU1 and/or battery BAT is easily analyzed. In addition, the reduction in weight of the electronic device EA1 can be also achieved by providing the space SP1 inside the volume part CP1.

However, according to the ninth feature point in the first embodiment, there is also a disadvantage that the module unit MJU1 and/or battery BAT tend to rattle. In this regard, in the first embodiment, as illustrated in FIG. 12, there is applied a device for providing unevenness as the shape of the volume part CP1 so as to fit the uneven shape of the module unit MJU1 and the shape of the battery BAT. Namely, in the first embodiment, there is applied a device for providing unevenness as the inner-wall shape of the volume part CP1 so as to reflect the uneven shape associated with mounting of the components of the module unit MJU1 and the shape of the battery BAT. This is a tenth feature point in the first embodiment, and according to the tenth feature point, the rattling of the module unit MJU1 and/or rattling of the battery BAT can be alleviated.

In the first embodiment, a further devise is applied from the viewpoint of alleviating the rattling of the module unit MJU1 and/or rattling of the battery BAT, and the point devised is an eleventh feature point in the first embodiment. Hereinafter, the eleventh feature point in the first embodiment will be described.

AS illustrated in FIG. 12, the eleventh feature point in the first embodiment consists in the point that the battery BAT and the sensor module SM (sensor) mounted on the lower surface of the wiring board WB1 are caused to adhere to each other with an adhesive material ADH2, and the battery BAT and the bottom surface of the volume part CP1 are caused to adhere to each other with an adhesive material ADH3.

For example, in the first embodiment, the sensor module SM mounted on the lower surface (rear surface) of the wiring board WB1 and the upper surface of the battery BAT are caused to adhere to each other with a double-sided tape, and the lower surface of the battery BAT and the bottom surface of the volume part CP1 are caused to adhere to each other with a double-sided tape. Accordingly, a sensor in the sensor module SM will be fixed to the volume part CP1 via the battery BAT. Thus, the module unit MJU1 and the battery BAT will be fixed to the volume part CP1. Furthermore, in FIG. 12, in an area directly under the antenna ANT1, the lower surface of the wiring board WB2 (module unit MJU1) and the case CS may be caused to adhere to each other with an adhesive material or the like.

As the result, according to the eleventh feature point in the first embodiment, the rattling of the module unit MJU1 and the rattling of the battery BAT in the volume part CP1 (space SP1) can be suppressed. Furthermore, when an acceleration sensor is used as the sensor in the sensor module SM, superposition of noises onto a signal from the acceleration sensor caused by the rattling can be suppressed, and thus a degradation in the sensing sensitivity of the acceleration sensor can be suppressed. Namely, the rattling of the module unit MJU1 and/or rattling of the battery BAT are suppressed by the eleventh feature point in the first embodiment, with the result that the original performance (sensing sensitivity) of the acceleration sensor can be derived according to the electronic device EA1 in the first embodiment.

Note that, as the adhesive material ADH2 or the adhesive material ADH3, wax or a visible-light curable provisional fixing material other than the above-described double-sided tape may be used. For example, as the adhesive material ADH2 or adhesive material ADH3, a wax that can be peeled when soaked in warm water may be used.

Second Embodiment

Although, in the first embodiment, there has been described a configuration example in which a rechargeable secondary battery is used as the battery BAT, in a second embodiment, there will be described a configuration example in which a primary battery without the charging function is used as the battery BAT.

Figure 13:
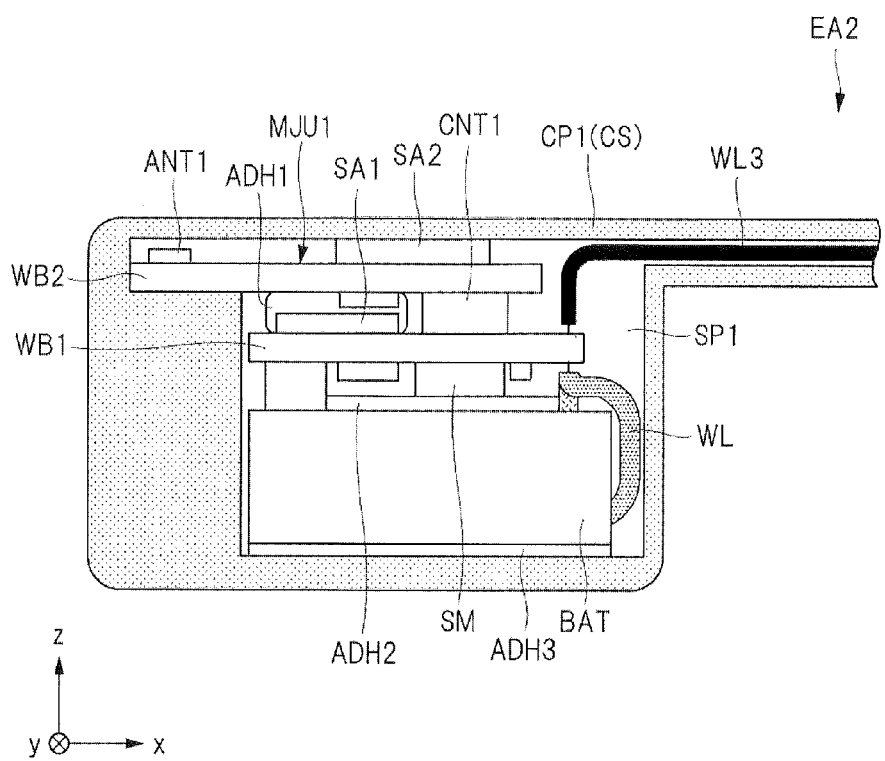
FIG. 13 is a perspective side view obtained by enlarging and illustrating a part of an electronic device in a second embodiment.

FIG. 13 is a perspective side view obtained by enlarging and illustrating a part of an electronic device EA2 in the second embodiment. In FIG. 13, the battery BAT in the second embodiment is constituted of a primary battery without the charging function. Accordingly, as illustrated in FIG. 13, in the electronic device EA2 in the second embodiment, the wiring board WB1 constituting a part of the module unit MJU1 and the battery BAT are directly coupled to each other with a wiring WL. Namely, because the battery BAT in the second embodiment is not assumed to be charged, the battery BAT is not detached. Therefore, in the electronic device EA2 in the second embodiment, there is no need to couple the wiring board WB1 and the battery BAT via the detachable connector CNT2, unlike the first embodiment. For this reason, in the electronic device EA2 in the second embodiment, the wiring board WB1 constituting a part of the module unit MJU1 and the battery BAT are directly coupled to each other with the wiring WL. In this case, according to the electronic device EA2 in the second embodiment, the reduction in size can be achieved by a space for the connector CNT2, as compared with the electronic device EA1 in the first embodiment. In particular, the electronic device EA2 in the second embodiment is effective in the application of lower power consumption.

Third Embodiment

In a third embodiment, a configuration example is described in which a wirelessly-chargeable secondary battery is used as the battery BAT.

Figure 14:
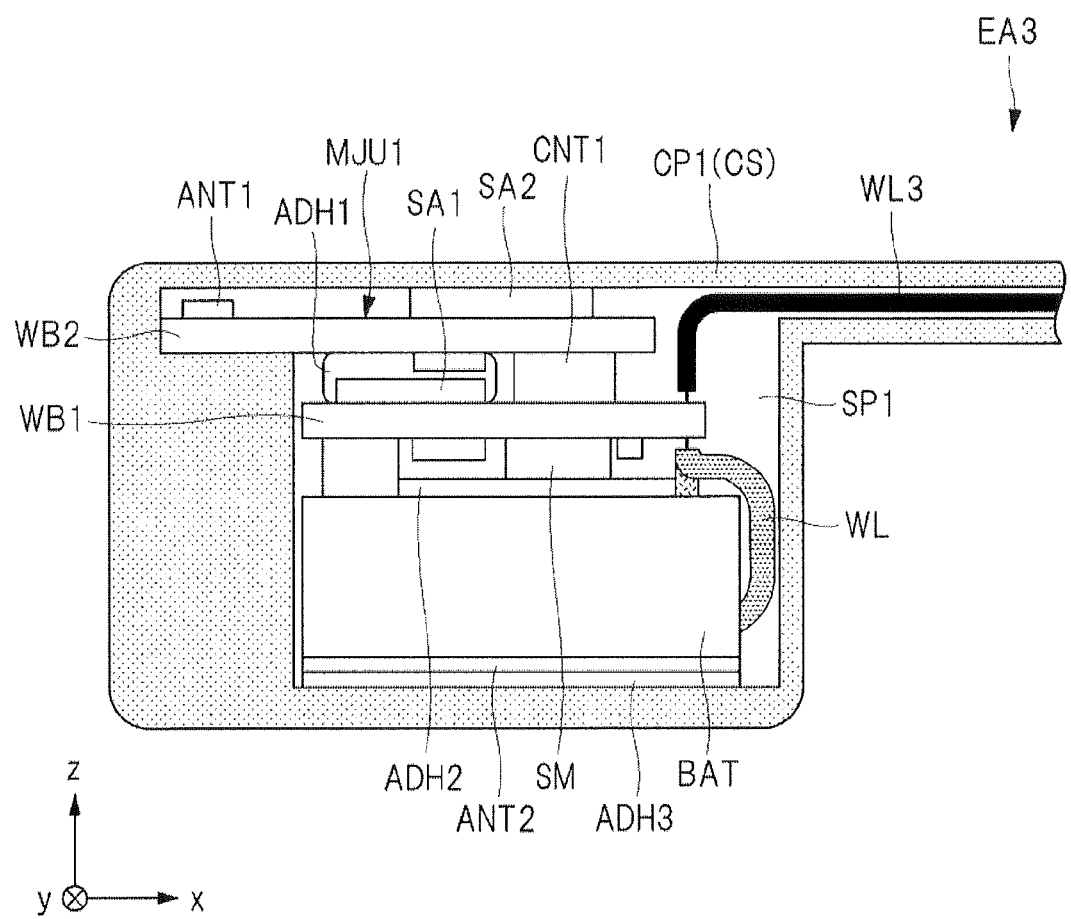
FIG. 14 is a perspective side view obtained by enlarging and illustrating a part of an electronic device in a third embodiment.

FIG. 14 is a perspective side view obtained by enlarging and illustrating a part of an electronic device EA3 in the third embodiment. In FIG. 14, the battery BAT in the third embodiment is constituted of a wirelessly-chargeable secondary battery. In addition, as illustrated in FIG. 14, in the electronic device EA3 in the third embodiment, a wireless power-feeding antenna ANT2 is provided on the bottom surface of the battery BAT, for example. Additionally, the wireless power-feeding antenna ANT2 is coupled to the battery BAT via a power feeding control circuit. Therefore, electric power supplied from a charger can be supplied to the battery BAT via the wireless power-feeding antenna ANT2, by using, for example, an electromagnetic induction system or a magnetic field resonance system.

In particular, in the third embodiment, it is assumed that the electronic device EA3 is arranged over the charger to charge the battery BAT. Namely, the shorter the distance between the wireless power-feeding antenna ANT2 and the charger, the further the charging efficiency of the battery BAT can be enhanced. Therefore, in the third embodiment, the wireless power-feeding antenna ANT2 is provided on the bottom surface of the battery BAT on the assumption that the electronic device EA3 is arranged over the charger.

As described above, in the electronic device EA3 in the third embodiment, the battery BAT is not detached because the battery BAT can be wirelessly charged. Therefore, in the electronic device EA3 in the third embodiment, there is no need to couple the wiring board WB1 and the battery BAT via the detachable connector CNT2, as with the first embodiment. For this reason, in the electronic device EA3 in the third embodiment, the wiring board WB1 constituting a part of the module unit MJU1 and the battery BAT are directly coupled to each other with the wiring WL. In this case, according to the electronic device EA3 in the third embodiment, the reduction in size can be achieved by a space for the connector CNT2, as compared with the electronic device EA1 in the first embodiment. On the other hand, in the electronic device EA3 in the third embodiment, the battery BAT can be also charged. For this reason, the electronic device EA3 in the third embodiment has an advantage that it can be repeatedly used over a long period of time while achieving the reduction in size.

Figure 15:
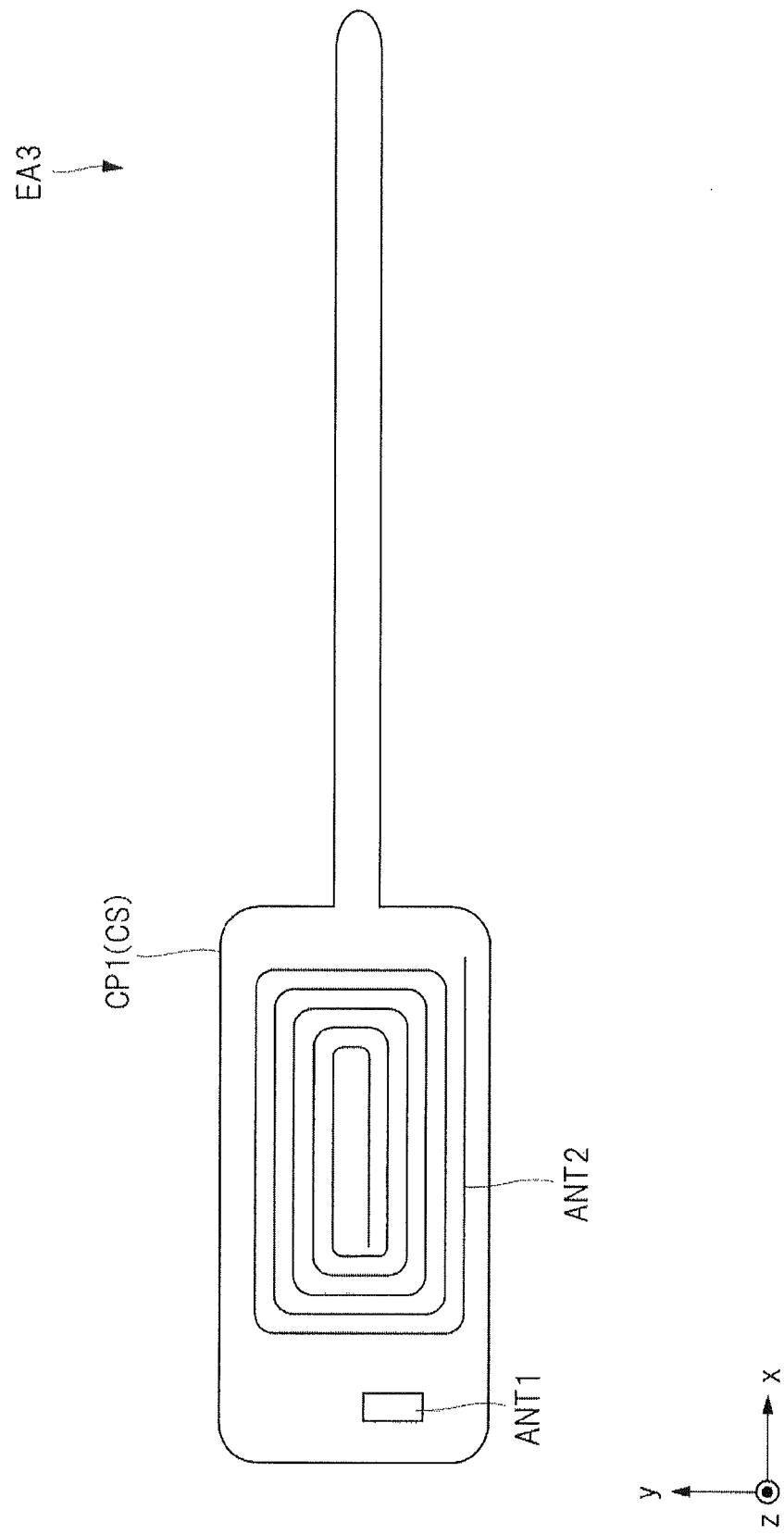
FIG. 15 schematically illustrates a planar positional relationship between an antenna and wireless power-feeding antenna, disposed within a case of the electronic device in the third embodiment.

Note that FIG. 15 schematically illustrates a planar positional relationship between the antenna ANT1 and the wireless power-feeding antenna ANT2 which are arranged within the case CS of the electronic device EA3 in the third embodiment. As illustrated in FIG. 15, the wireless power-feeding antenna ANT2 has a spiral shape, and is arranged so that the antenna ANT1 and the wireless power-feeding antenna ANT2 do not overlap in a plan view. Therefore, according to the third embodiment, it is known that the wireless power-feeding antenna ANT2 is arranged without adversely affecting the characteristics of the antenna ANT1 that is the communication antenna.

<First Modification>

Figure 16:
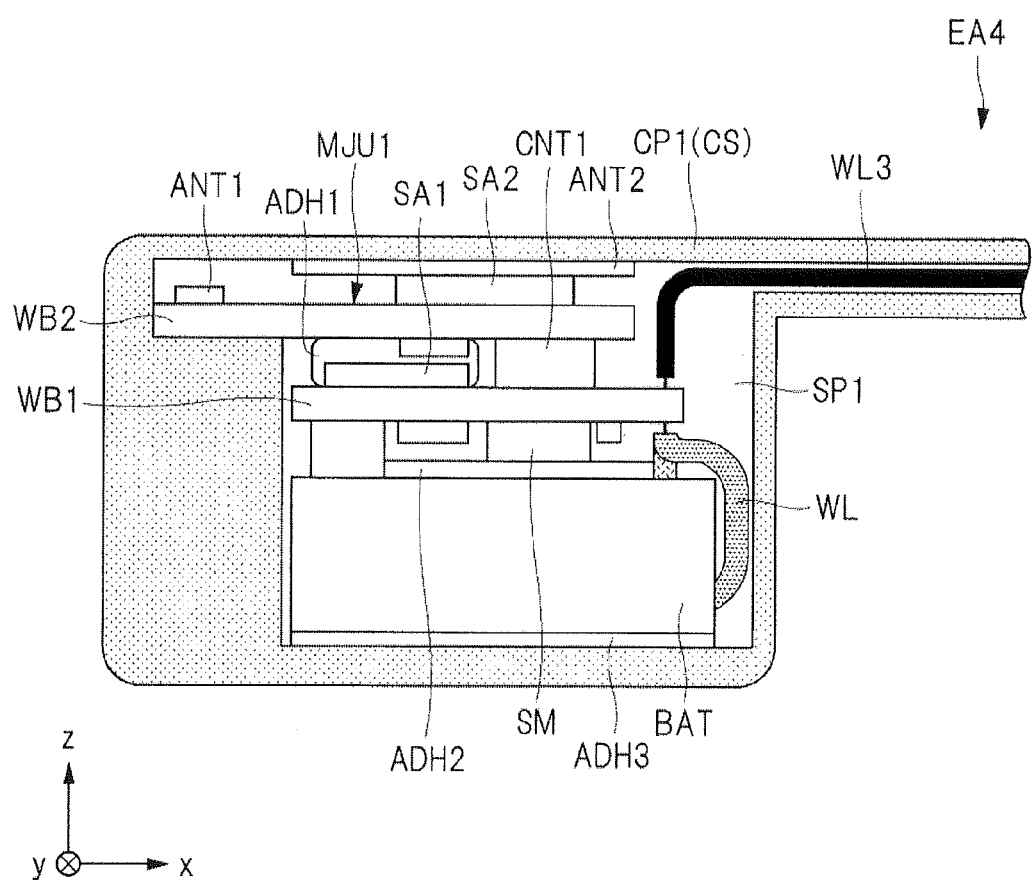
FIG. 16 is a perspective side view obtained by enlarging and illustrating a part of an electronic device in a first modification.

FIG. 16 is a perspective side view obtained by enlarging and illustrating a part of an electronic device EA4 in a first modification. In FIG. 16, the battery BAT in the first modification is constituted of a wirelessly-chargeable secondary battery. In addition, as illustrated in FIG. 16, in the electronic device EA4 in the first modification, the wireless power-feeding antenna ANT2 is provided, for example, above the module unit MJU1. Also in this case, electric power supplied from a charger can be supplied to the battery BAT via the wireless power-feeding antenna ANT2, by using an electromagnetic induction system or a magnetic field resonance system.

In particular, in the first modification, it is assumed that a charger is arranged on the upper side of the electronic device EA4 to charge the battery BAT. Namely, the shorter the distance between the wireless power-feeding antenna ANT2 and the charger, the further the charging efficiency of the battery BAT can be enhanced. Therefore, in the first modification, the wireless power-feeding antenna ANT2 is provided above the module unit MJU1 assuming that a charger is arranged on the upper side of the electronic device EA4.

<Second Modification>

Figure 17:
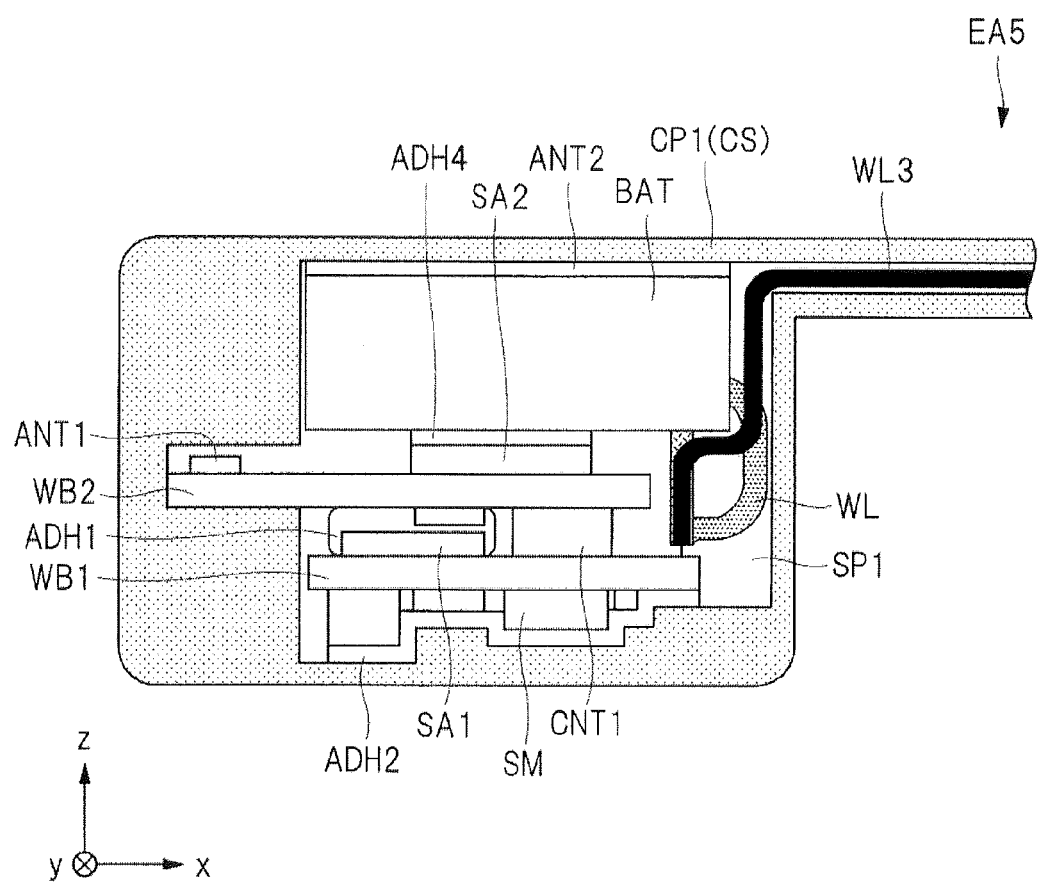
FIG. 17 is a perspective side view obtained by enlarging and illustrating a part of an electronic device in a second modification.

FIG. 17 is a perspective side view obtained by enlarging and illustrating a part of an electronic device EA5 in a second modification. In FIG. 17, the battery BAT in the second modification is constituted of a wirelessly-chargeable secondary battery. In addition, as illustrated in FIG. 17, in the electronic device EA5 in the second modification, the wireless power-feeding antenna ANT2 and the battery BAT are integrally provided, for example, above the module unit MJU1. In particular, in the second modification, as illustrated in FIG. 17, the semiconductor device SA2 mounted in the wiring board WB2 and the battery BAT adhere to each other with an adhesive ADH4, and the wireless power-feeding antenna ANT2 is provided over the battery BAT. Also in this case, electric power supplied from a charger can be supplied to the battery BAT via the wireless power-feeding antenna ANT2, by using electromagnetic induction.

Fourth Embodiment

In a fourth embodiment, there will be described an example of arranging the module unit MJU1 and the battery BAT side by side in a plan view.

Figure 18:
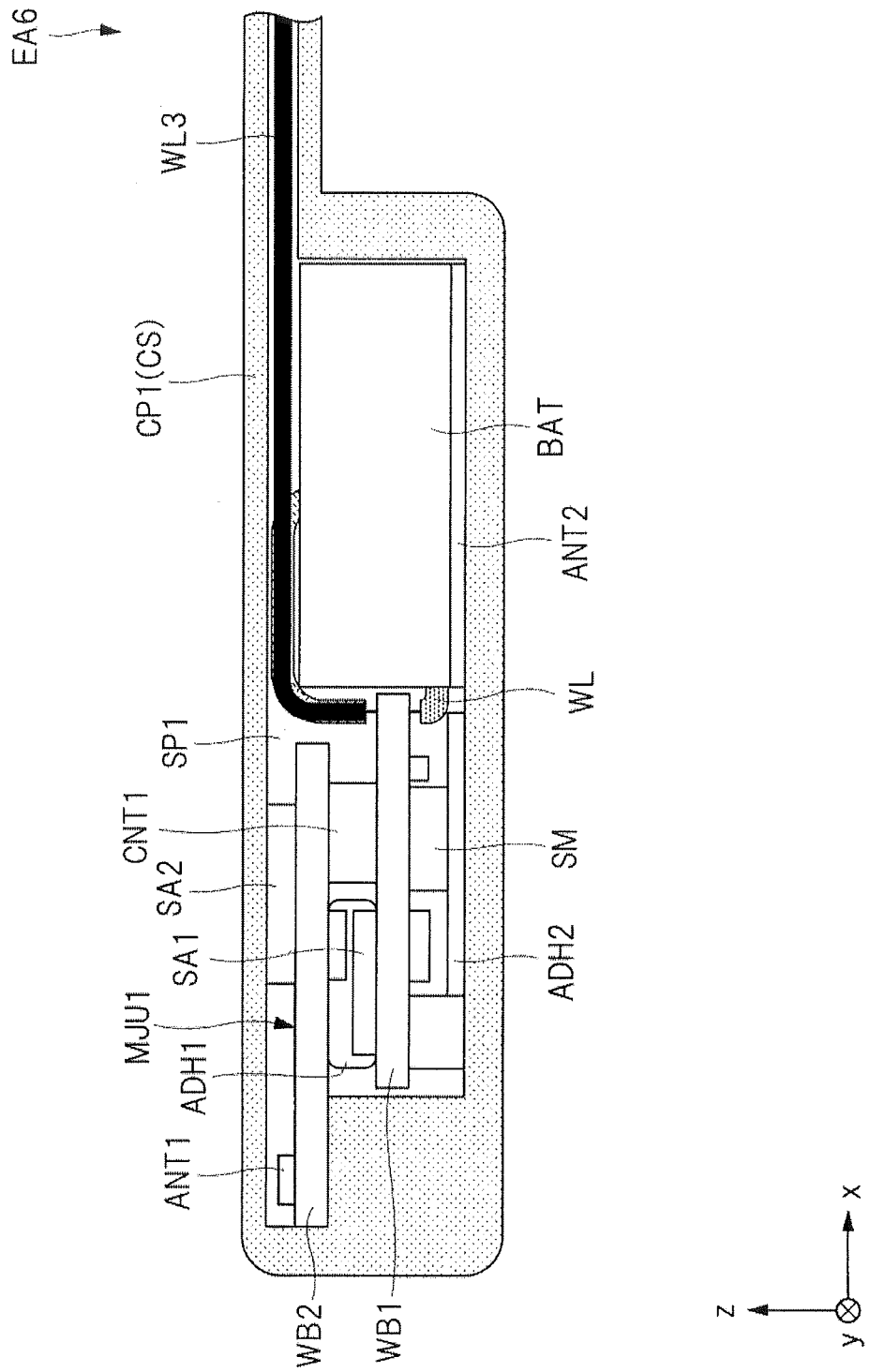
FIG. 18 is a perspective side view obtained by enlarging and illustrating a part of an electronic device in a fourth embodiment.

FIG. 18 is a perspective side view obtained by enlarging and illustrating a part of an electronic device EA6 in the fourth embodiment. In FIG. 18, in the electronic device EA6 in the fourth embodiment, the module unit MJU1 and the battery BAT are planarly arranged side by side. Then, the battery BAT in the fourth embodiment is also constituted of a wirelessly-chargeable secondary battery, and the wireless power-feeding antenna ANT2 is provided on the bottom surface of the battery BAT. Here, when the battery BAT is also constituted from a wirelessly-chargeable secondary battery, the battery BAT can be charged even without having to be detached, and thus there is basically no need to provide a connector for coupling the battery BAT and the module unit MJU1, but a connector may be provided for coupling the battery BAT and the module unit MJU1. In the case where the connector is provided, it is advantageous that when the battery BAT fails, the failed battery BAT can be easily replaced with a new battery BAT.

In the electronic device EA6 in the fourth embodiment constituted in this way, the module unit MJU1 and the battery BAT are planarly arranged side by side. Therefore, although the plane area (footprint) of the whole electronic device EA6 increases, the reduction in thickness of the whole electronic device EA6 can be achieved. Accordingly, the electronic device EA6 in the fourth embodiment is effective in application requiring the reduction in thickness.

<First Modification>

Figure 19:
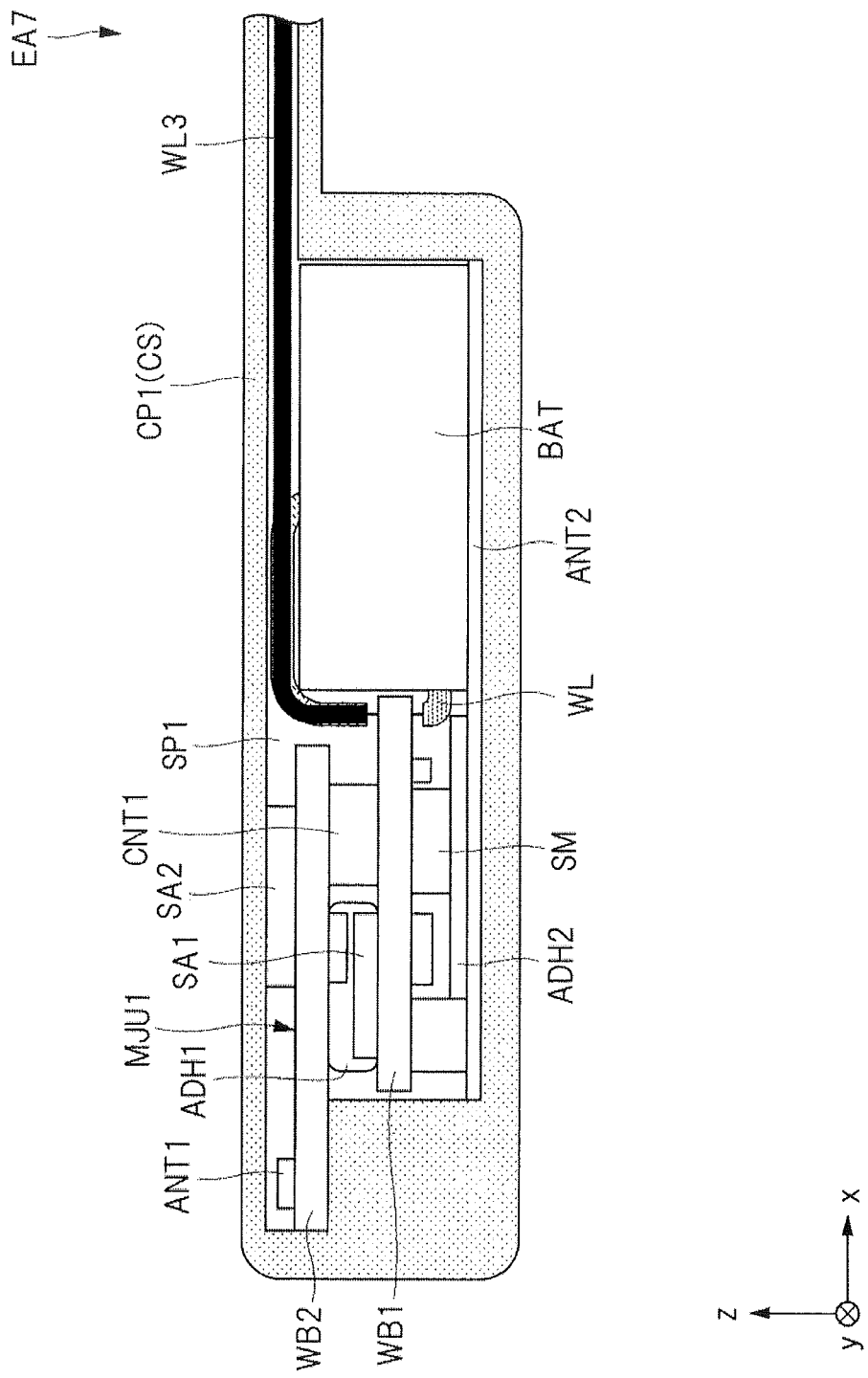
FIG. 19 is a perspective side view obtained by enlarging and illustrating a part of an electronic device in a first modification.

FIG. 19 is a perspective side view obtained by enlarging and illustrating a part of an electronic device EA7 in a first modification. In FIG. 19, in the electronic device EA7 in the first modification, the module unit MJU1 and the battery BAT are planarly arranged side by side. Then, the battery BAT in the first modification is also constituted from a wirelessly-chargeable secondary battery, and the wireless power-feeding antenna ANT2 is provided so as to extend from the bottom surface of the battery BAT to the bottom surface side of the module unit MJU1 (so as to extend in the x direction). Thus, according to the electronic device EA7 in the first modification, power supply efficiency with respect to the battery BAT can be enhanced since the size of the wireless power-feeding antenna ANT2 can be increased.

<Second Modification>

FIG. 20 is a perspective side view obtained by enlarging and illustrating a part of an electronic device EA8 in a second modification. In FIG. 20, in the electronic device EA8 in the second modification, the module unit MJU1 and the battery BAT are planarly arranged side by side. Then, the battery BAT in the second modification is also constituted from a wirelessly-chargeable secondary battery, and the wireless power-feeding antenna ANT2 is provided so as to extend from the upper surface of the battery BAT to the upper surface side of the module unit MJU1 (so as to extend in the x direction). Therefore, also with the electronic device EA8 in the second modification, power supply efficiency with respect to the battery BAT can be enhanced since the size of the wireless power-feeding antenna ANT2 can be increased.

Fifth Embodiment

<Detailed Description of Size Reduction Method>

In a fifth embodiment, the detail of the design point in achieving the reduction in size of the electronic device described in the first embodiment is described.

FIG. 21 illustrates a mounting configuration of the module unit MJU1 in the fifth embodiment. Specifically, FIG. 21A is a perspective view illustrating the mounting configuration of the module unit MJU1 in the fifth embodiment, and FIG. 21B is a side view illustrating the mounting configuration of the module unit MJU1 in the fifth embodiment.

First, as illustrated in FIG. 21A, the module unit MJU1 in the fifth embodiment is constituted of a stacked structure of the wiring board WB1 and the wiring board WB2. For example, the module unit MJU1 in the fifth embodiment is constituted of the wiring board WB1 arranged in the lower part thereof and the wiring board WB2 arranged in the upper part of the wiring board WB1.

According to the module unit MJU1 in the fifth embodiment that is constituted of a stacked structure of the wiring board WB1 and the wiring board WB2 in this way, the number of electronic components mounted in the respective wiring board WB1 and wiring board WB2 decreases as compared with a case where, for example, both the electronic components mounted in the wiring board WB1 and the electronic components mounted in the wiring board WB2 are mounted over one wiring board. This means that the plane size of the wiring board WB1 and the plane size of the wiring board WB2 can be reduced, and thus the plane size of the whole module unit MJU1 constituted of the stacked structure of the wiring board WB1 and wiring board WB2 significantly decreases. As a result, according to the fifth embodiment, the reduction in size of an electronic device including the module unit MJU1 can be achieved.

Then, on the assumption that the module unit MJU1 in the fifth embodiment is constituted of a stacked structure of the wiring board WB1 and the wiring board WB2, the further reduction of the plane size of the wiring board WB1 and wiring board WB2 is achieved by further mounting electronic components on both surfaces of the wiring board WB1 and by mounting electronic components also on both surfaces of the wiring board WB2.

Specifically, as illustrated in FIG. 21B, in an electronic device serving as an element of a wireless communication system, the electronic device includes the wiring board WB1, and the wiring board WB2 electrically coupled to the wiring board WB1 via the connector CNT1. In addition, as illustrated in FIG. 21B, the wiring board WB1 and the wiring board WB2 are stacked and arranged in a state where the upper surface of the wiring board WB1 faces the lower surface of the wiring board WB2, to thereby constitute the module unit MJU1. At this time, a part of the connector CNT1 is mounted on the upper surface of the wiring board WB1. Specifically, the connector CNT1 has a structure in which a plug is inserted into a socket (receptacle). For example, "a part of the connector CNT1" means any one of the socket and the plug, and "the other part of the connector CNT1" means the plug when "a part of the connector CNT1" is the socket and means the socket when "a part of the connector CNT1" is the plug. Namely, in the fifth embodiment, each of "a part of the connector CNT1" and "the other part of the connector CNT1" corresponds to any one of the socket and plug constituting the connector CNT1. Furthermore, the semiconductor device SA1 electrically coupled to a part of the connector CNT1 and the electronic components electrically coupled to the semiconductor device SA1 are mounted on the upper surface of the wiring board WB1. On the other hand, the sensor module SM including a sensor that detects a physical quantity and the electronic components are mounted on the lower surface of the wiring board WB1. In addition, the antenna (communication antenna) ANT1, the semiconductor device SA2 electrically coupled to the antenna ANT1, and the electronic components are mounted on the upper surface of the wiring board WB2, whereas on the lower surface of the wiring board WB2, the other part of the connector CNT1 electrically coupled to the semiconductor device SA2 and the electronic components electrically coupled to the semiconductor device SA2 are mounted.

In this way, according to the fifth embodiment, electronic components are mounted on both surfaces of the wiring board WB1, and electronic components are mounted also on both surfaces of the wiring board WB2. Therefore, the reduction of the plane size of the wiring board WB1 and wiring board WB2 can be achieved, and thus the plane size of the whole module unit MJU1 constituted of a stacked structure of the wiring board WB1 and wiring board WB2 can be further reduced. Furthermore, in the fifth embodiment, not only by mounting the electronic components on both surfaces of the wiring board WB1 but also by devising the arrangement and the like between the electronic components mounted on both surfaces of the wiring board WB1, the reduction in size of the whole electronic device is achieved while achieving the improvement of the performance of the electronic device. Similarly, in the fifth embodiment, the reduction in size of the whole electronic device is realized while achieving the improvement of the performance of the electronic device, not only by mounting the electronic components on both surfaces of the wiring board WB2 but also by devising the arrangement and the like between the electronic components mounted on both surfaces of the wiring board WB2.

Hereinafter, first, a point devised of the both-side mounting of the electronic components in the wiring board WB2 will be described, and subsequently a point devised of the both-side mounting of the electronic components in the wiring board WB1 is described.

<Point Devised with Respect to Wiring Board WB2>

Figure 22A:
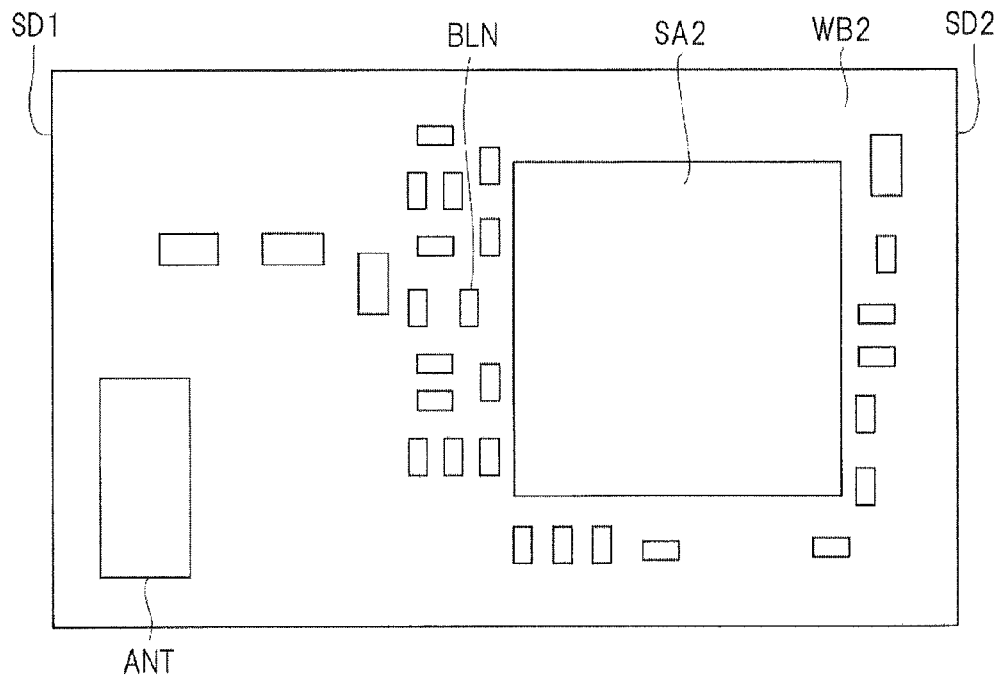
FIG. 22A is a top view of a second wiring board.
Figure 22B:
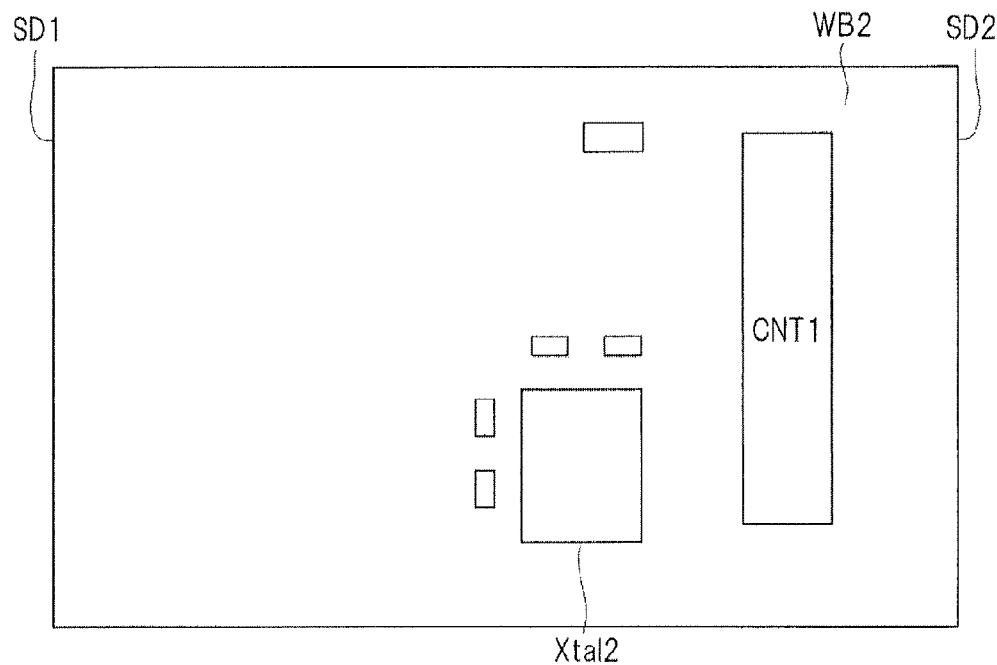
FIG. 22B is a bottom view of the second wiring board.

FIG. 22A is a top view of the wiring board WB2, and FIG. 22B is a bottom view of the wiring board WB2. In FIG. 22A, the antenna ANT1, the semiconductor device SA2, and a balun BLN are mounted on the upper surface of the wiring board WB2. At this time, the semiconductor device SA2 serves as a wireless communication unit constituted to transmit the data based on an output signal from a sensor. Accordingly, the communication antenna ANT1 and the semiconductor device SA2 serving as the wireless communication unit are mounted on the same surface (upper surface) of the wiring board WB2. As a result, a degradation of the transmission and reception signals exchanged between the semiconductor device SA2 serving as the wireless communication unit and the communication antenna ANT1 can be suppressed. For example, when the antenna ANT1 and the semiconductor device SA2 are mounted on different surfaces of the wiring board WB2, the antenna ANT1 and the semiconductor device SA2 need to be electrically coupled via a via (plug) penetrating the wiring board WB2. However, in this case, the transmission and reception signals exchanged between the semiconductor device SA2 serving as the wireless communication unit and the antenna ANT1 are transmitted via the via and thus easily deteriorate. In contrast, in the fifth embodiment, the semiconductor device SA2 and the antenna ANT1 are mounted on the same surface (upper surface) of the wiring board WB2 and thus the semiconductor device SA2 and the antenna ANT1 do not need to be coupled via a via. As a result, according to the fifth embodiment, a degradation of the transmission and reception signals exchanged between semiconductor device SA2 functioning as the wireless communication unit and antenna ANT1 can be suppressed.

Furthermore, in the fifth embodiment, as illustrated in FIG. 22A, the wiring board WB2 has a rectangular shape with a pair of side SD1 and side SD2 facing each other, in which the antenna ANT1 is arranged on the side SD1 side and the semiconductor device SA2 is arranged on the side SD2 side. Accordingly, the distance between the semiconductor device SA2 functioning as the wireless communication unit and the antenna ANT1 can be increased and thus a degradation of the characteristics of the antenna ANT1 can be suppressed. Moreover, the balun BLN can be arranged between the antenna ANT1 and the semiconductor device SA2 while reducing the size of the wiring board WB2, by arranging the antenna ANT1 on the side SD1 side and arranging the semiconductor device SA2 on the side SD2 side.

Specifically, in the fifth embodiment, as illustrated in FIG. 22A, the balun BLN electrically coupled to the semiconductor device SA2 and antenna ANT1 is further mounted on the upper surface of the wiring board WB2, and the balun BLN is arranged between the semiconductor device SA2 and the antenna ANT1 in a plan view.

At this time, a transmission signal is transmitted to the semiconductor device SA2, balun, and antenna ANT1 in this order (see FIG. 4), whereas reception signal is transmitted to the antenna ANT1, balun BLN, and semiconductor device SA2 in this order. For this reason, a layout of the electronic components along the transmission path of the transmission and reception signals can be realized by arranging the balun BLN between the antenna ANT1 and the semiconductor device SA2. Then, according to the layout of the electronic components along the transmission path of the transmission and reception signals, the electronic components can be coupled to each other by using a short distance wiring. This means that an efficiency in layout of electronic components can be enhanced and also that a degradation of performance of the electronic device due to the parasitic resistance of a wiring can be suppressed. Namely, according to the fifth embodiment, by realizing the layout of the electronic components along the transmission path of the transmission and reception signals, i.e., by arranging the balun BLN between the antenna ANT1 and the semiconductor device SA2, a reduction of the plane size of the wiring board WB2 (the reduction in size of the module unit MJU1) can be achieved and also enhancement of the electrical characteristics of the electronic device can be achieved.

Note that, as illustrated in FIG. 21B, the wiring board WB2 has the overlapping area DP2 in which the wiring board WB2 overlaps with the wiring board WB1 in a plan view and the non-overlapping area NDP2 in which the wiring board WB2 does not overlap with the wiring board WB1 in a plan view. At this time, the antenna ANT1 is arranged in the non-overlapping area NDP2 of the upper surface of the wiring board WB2, whereas the semiconductor device SA2 is arranged in the overlapping area DP2 of the upper surface of the wiring board WB2. Furthermore, the balun BLN electrically coupled to the semiconductor device SA2 and antenna ANT1 is mounted on the upper surface of the wiring board WB2, and the balun BLN is also arranged in the overlapping area DP2. Therefore, according to the fifth embodiment, the characteristics of the antenna ANT1 can be improved while achieving the reduction in size of the wiring board WB2.

For example, the semiconductor device SA2 can be constituted of a package structure such as a QFP (Quad Flat Package) or a BGA (Ball Grid Array). However, in the fifth embodiment, in particular, the semiconductor device SA2 includes a semiconductor chip mounted in a chip state on the upper surface of the wiring board WB2, and the semiconductor chip has a structure sealed with a potting resin. Namely, in the fifth embodiment, the semiconductor device SA2 has a structure (COB structure: Chip On Board) in which a bare-chip mounted semiconductor chip is sealed with a potting resin, and according to the semiconductor device SA2 having such a structure, the size of the semiconductor device SA2 itself can be further reduced as compared with the cases where the semiconductor device SA2 has a package structure such as a QFP or a BGA. Therefore, according to the fifth embodiment, the plane size of the wiring board WB2 in which the semiconductor device SA2 is mounted can be further reduced, due to the additional effect of the reduction in size of the semiconductor device SA2 itself by causing the semiconductor device SA2 to have a COB structure.

Subsequently, as illustrated in FIG. 22B, the connector CNT1 (strictly speaking, this is the other part of the connector CNT1, but is referred to as the connector CNT1 for the sake of convenience) and a crystal oscillator Xtal2 are mounted on the lower surface of the wiring board WB2. At this time, the connector CNT1 is an electronic component having the second largest occupied area next to the semiconductor device SA2 that is mounted on the upper surface of the wiring board WB2. Then, in the fifth embodiment, in order to avoid mounting the semiconductor device SA2 and connector CNT1 each having a large occupied area on the same surface of the wiring board WB2, the semiconductor device SA2 having the largest occupied area is mounted on the upper surface of the wiring board WB2 and the connector CNT1 having the next largest occupied area is mounted on the lower surface of the wiring board WB2. Namely, in the fifth embodiment, the semiconductor device SA2 having the largest occupied area and the connector CNT1 having the next largest occupied area are mounted on the different surfaces (the upper surface and the lower surface). Therefore, according to the fifth embodiment, the plane size of the wiring board WB2 can be reduced as compared with a configuration in which the semiconductor device SA2 having the largest occupied area and the connector CNT1 having the next largest occupied area are mounted on the same plane of the wiring board WB2.

Furthermore, as illustrated in FIG. 21B, the connector CNT1 is arranged in the overlapping area DP2 of the lower surface of the wiring board WB2. Moreover, the crystal oscillator Xtal2 is mounted on the lower surface of the wiring board WB2, and the crystal oscillator Xtal2 is arranged also in the overlapping area DP2. Therefore, according to the fifth embodiment, the characteristics of the antenna ANT1 mounted in the non-overlapping area NDP2 of the upper surface of the wiring board WB2 can be improved while achieving the reduction in size of the wiring board WB2.

In addition, as illustrated in FIG. 21B, the semiconductor device SA2 mounted on the upper surface of the wiring board WB2 and the crystal oscillator Xtal2 mounted on the lower surface of the wiring board WB2 are arranged so as to overlap with each other via the wiring board WB2 in a cross-sectional view. In other words, as illustrated in FIG. 22A and FIG. 22B, the semiconductor device SA2 mounted on the upper surface of the wiring board WB2 and the crystal oscillator Xtal2 mounted on the lower surface of the wiring board WB2 are arranged so as to overlap with each other in a plan view. Accordingly, a degradation of a reference clock output from the crystal oscillator Xtal2 can be suppressed. Namely, the reference clock output from the crystal oscillator Xtal2 is used as an input to the semiconductor device SA2, and thus, from the viewpoint of suppressing a degradation of the reference clock input to the semiconductor device SA2, the semiconductor device SA2 and the crystal oscillator Xtal2 are preferably arranged in proximity as much as possible. For this reason, in the fifth embodiment, the semiconductor device SA2 mounted on the upper surface of the wiring board WB2 and the crystal oscillator Xtal2 mounted on the lower surface of the wiring board WB2 are arranged so as to overlap with each other in a plan view, and thus the distance between the semiconductor device SA2 and the crystal oscillator Xtal2 is reduced. As a result, according to the fifth embodiment, the reference clock output from the crystal oscillator Xtal2 can be input to the semiconductor device SA2 without being degraded, and thus a decrease in function of the wireless communication unit caused by a degradation of the reference clock can be suppressed.

Note that, in the fifth embodiment, as illustrated in FIG. 22B, the arrangement position of the connector CNT1 is a position closest to the side SD2 side among the arrangement positions of the electronic components such as the crystal oscillator Xtal2, mounted on the lower surface of the wiring board WB2. In other words, as illustrated in FIG. 22B, the arrangement position of the connector CNT1 is a position farthest from the side SD1 side among the arrangement positions of the electronic components such as the crystal oscillator Xtal2, mounted on the lower surface of the wiring board WB2. Namely, the arrangement position of the connector CNT1 is a position distant from the non-overlapping area NDP2 in which the antenna ANT1 illustrated in FIG. 21B is arranged, among the arrangement positions of the electronic components mounted on the lower surface of the wiring board WB2. Therefore, as illustrated in FIG. 22B, a space in the left side area (area on the side SD1 side) of the connector CNT1 can be secured. This means that in FIG. 21B a space for arranging electronic components other than the connector CNT1 can be secured also on the upper surface of the wiring board WB1 arranged on a layer lower than the wiring board WB2. As a result, according to the fifth embodiment, the reduction in size of not only the wiring board WB2 but also the wiring board WB1 can be achieved. Hereinafter, a point devised with respect to the wiring board WB1 will be described.

<Point Devised with Respect to Wiring Board WB1>

For example, it is considered that the module unit MJU1 is mounted in a device with a larger area and used. In this case, in consideration of the mountability to the device of the module unit MJU1, the lower surface of the wiring board WB1 constituting the module unit MJU1 is preferably flat. Then, in a case where the module unit MJU1 is mounted to the device by soldering, it is preferable to mount a solder ball as with a BGA or to provide a coupling pad as with an LGA (Land Grid Array) on the lower surface of the wiring board WB1. In addition, mountability can also be enhanced by providing a side electrode on a side of the wiring board WB1. Furthermore, in a case where the module unit MJU1 is screwed to a device, a screwing through-hole is preferably provided in the wiring board WB1.

However, it can be considered that the module unit MJU1 is used without being mounted to another device. In particular, the module unit MJU1 in the fifth embodiment is assumed to be used without being mounted to another device. In this case, it is not necessary to make flat the lower surface of the wiring board WB1 in consideration of the mountability to another device, but electronic components can be mounted also on the lower surface of the wiring board WB1. As a result, according to the module unit MJU1 in the fifth embodiment, electronic components can be mounted not only on both surfaces of the wiring board WB2 but also on both surfaces of the wiring board WB1, and thus according to the fifth embodiment, the reduction in size of the module unit MJU1 can be achieved.

In particular, in the module unit MJU1 in the fifth embodiment, the plane size of the wiring board WB1 is smaller than the plane size of the wiring board WB2 as illustrated in FIG. 21A and FIG. 21B. Accordingly, when the reduction in size of the whole module unit MJU1 is considered, it is important to reduce the plane size of the wiring board WB1. Therefore, in the fifth embodiment, there is applied a device for reducing the plane size of the wiring board WB1, and hereinafter, this point devised will be described.

Figure 23:
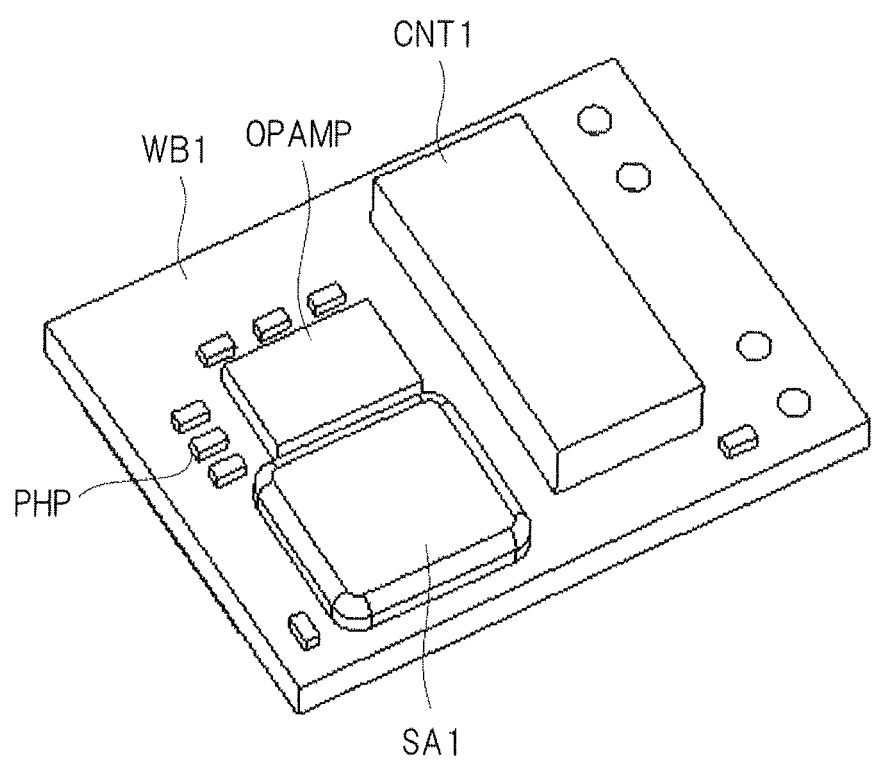
FIG. 23 is a perspective view schematically illustrating the top surface of a first wiring board.

FIG. 23 is a perspective view schematically illustrating a top surface of the wiring board WB1. As illustrated in FIG. 23, the connector CNT1 (strictly speaking, this is a part of the connector CNT1, but is referred to as the connector CNT1 for convenience of the description) is mounted on the upper surface of the wiring board WB1. Here, since the connector CNT1 mounted in the wiring board WB2 is arranged on the side SD2 side as illustrated in FIG. 22B, the corresponding connector CNT1 of the wiring board WB1 is also arranged to the right side as illustrated in FIG. 23. As a result, as illustrated in FIG. 23, on the upper surface of the wiring board WB1 a space is secured in the left side area of the connector CNT1, and the semiconductor device SA1, an operational amplifier OPAMP, and peripheral components PHP of the operational amplifier are arranged in this space. As described above, the above-described electronic components are arranged in the space produced by shifting the arrangement position of the connector CNT1 to the right, and thus the upper surface of the wiring board WB1 is effectively used. As a result, the reduction in size of the wiring board WB1 can be achieved.

Figure 24A:
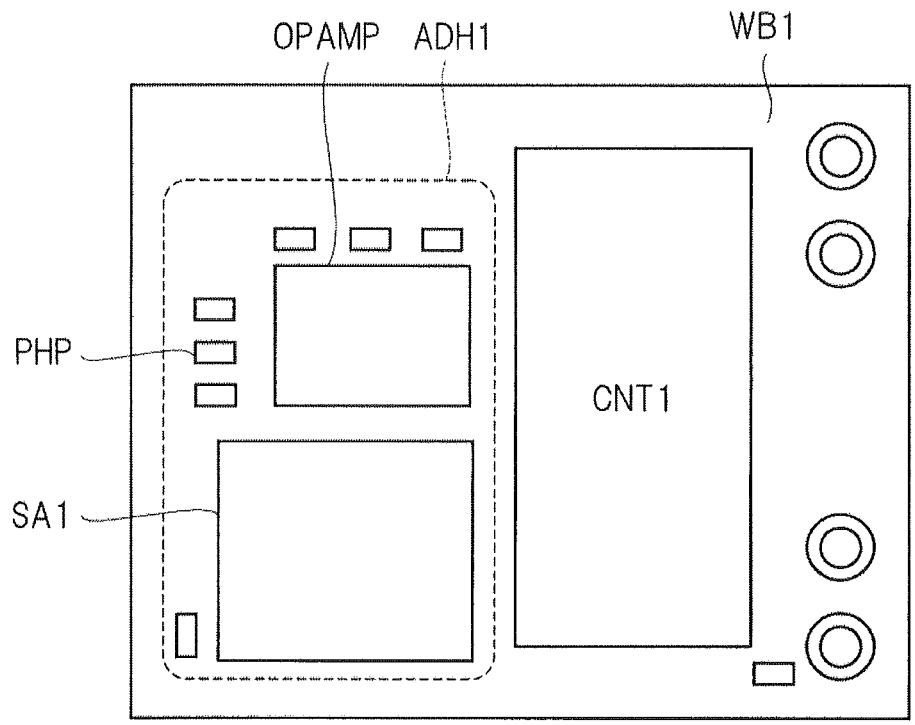
FIG. 24A is a top view of the first wiring board.

FIG. 24A is a top view of the wiring board WB1. In FIG. 24A, the semiconductor device SA1 functions as a digital data processing unit of a data processing unit configured to process a signal output from a sensor and to output a processed signal to the wireless communication unit, the data processing unit being constituted of an analog data processing unit and a digital data processing unit. The semiconductor device SA1 also has a function as an AD conversion unit configured to convert an analog signal to a digital signal. In addition, as illustrated in FIG. 24A, the operational amplifier OPAMP that outputs a reference potential to the AD conversion unit is mounted, on the upper surface of the wiring board WB1, so as to be adjacent to the semiconductor device SA1. Furthermore, the peripheral components PHP of the operational amplifier OPAMP are mounted in the periphery of the operational amplifier OPAMP. As described above, the semiconductor device SA1 having the function as the AD conversion unit, and the operational amplifier OPAMP that outputs the reference potential to the AD conversion unit, and the peripheral components are arranged in proximity on the upper surface of the wiring board WB1. Therefore, a degradation of the reference potential requiring accuracy can be suppressed. Namely, according to the fifth embodiment, the reduction in size of the plane size of the wiring board WB1 can be achieved by effectively using the upper surface of the wiring board WB1, and also the improvement of the performance as the electronic device can be achieved by mounting mutually related components all together as the electronic components arranged on the upper surface of the wiring board WB1.

Note that, for example, the semiconductor device SA1 may have a package structure such as a QFP or a BGA, but in the fifth embodiment, in particular, the semiconductor device SA1 includes a semiconductor chip that is mounted in a chip state on the upper surface of the wiring board WB1, and the semiconductor chip has a structure sealed with a potting resin. Namely, in the fifth embodiment, the semiconductor device SA1 has a structure (COB structure) in which a bare-chip mounted semiconductor chip is sealed with a potting resin. According to the semiconductor device SA1 of such a COB structure, the size of the semiconductor device SA1 itself can be further reduced as compared with the case where the semiconductor device SA1 has a package structure, such as a QFP or a BGA. Therefore, according to the fifth embodiment, due to the additional effect of the reduction in size of the semiconductor device SA1 itself by causing the semiconductor device SA1 to have a COB structure, the plane size of the wiring board WB1 in which the semiconductor device SA1 is mounted can be further reduced.

Figure 24B:
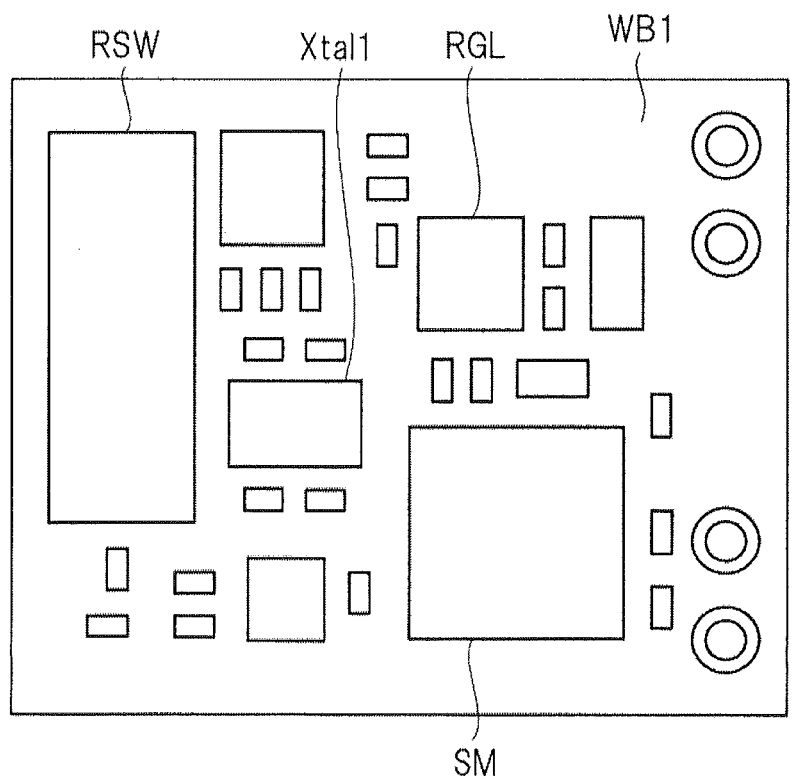
FIG. 24B is a bottom view of the first wiring board.

Next, the configuration of the lower surface of the wiring board WB1 is described. FIG. 24B is a bottom view of the wiring board WB1. As illustrated in FIG. 24B, for example, the sensor module SM including an acceleration sensor, a regulator RGL, a crystal oscillator Xtal1 that outputs a reference clock to the semiconductor device SA1, a reed switch RSW, and the like are mounted on the lower surface of the wiring board WB1. In particular, in the fifth embodiment, as apparent from FIG. 24A and FIG. 24B, the crystal oscillator Xtal1 is arranged in an area in which it overlaps with the semiconductor device SA1 in a plan view. Therefore, according to the fifth embodiment, the semiconductor device SA1 and the crystal oscillator Xtal1 can be arranged in proximity, and thus the reference clock output from the crystal oscillator Xtal1 can be input to the semiconductor device SA1 without being degraded.

Moreover, in the fifth embodiment, as illustrated in FIG. 24A and FIG. 24B, the sensor module SM is arranged in an area in which it overlaps with the connector CNT1 in a plan view. In this case, the sensor module SM is arranged on the rear surface of a fixing area of the connector CNT1 that couples the wiring board WB1 and the wiring board WB2, and thus the sensor module SM is unlikely to be affected by the noise due to the rattling and the S/N ratio improves. Accordingly, the increase in sensitivity of the sensor module SM can be achieved.

Furthermore, in the fifth embodiment, as illustrated in FIG. 24B, the reed switch RSW activated by magnetism is mounted on the lower surface of the wiring board WB1. For example, the electronic device in the fifth embodiment includes a sealed case in order to improve a waterproof property and a dustproof property, and this case can be constituted so as to include a volume part with a space and so that the module unit MJU1 is housed in the space of the volume part. In this case, the reed switch RSW is provided, and thus even in a state where the module unit MJU1 is housed within the case, it is possible to turn on and off the reed switch RSW by an external control by magnetism and to supply electric power to the module unit MJU1.

Here, the reed switch RSW may be relatively large and be higher than the engagement height of the small connector CNT1 in the fifth embodiment, but even in this case, the reed switch RSW can be mounted in the wiring board WB1 by mounting the reed switch RSW on the lower surface of the wiring board WB1. However, when a small reed switch using a MEMS (Micro Electro Mechanical Systems) technique is used, it is considered that the height of the reed switch is lower than the engagement height of the connector CNT1, and in this case, the reed switch RSW can also be arranged on the same surface (upper surface) as the connector CNT1.

<Modification>

Figure 25A:
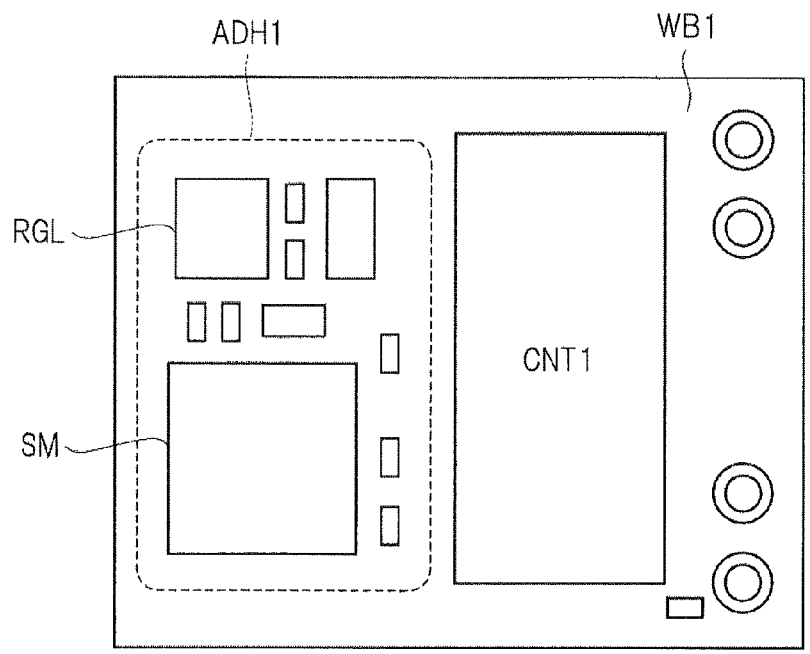
FIG. 25A is a top view of a first wiring board in a modification.
Figure 25B:
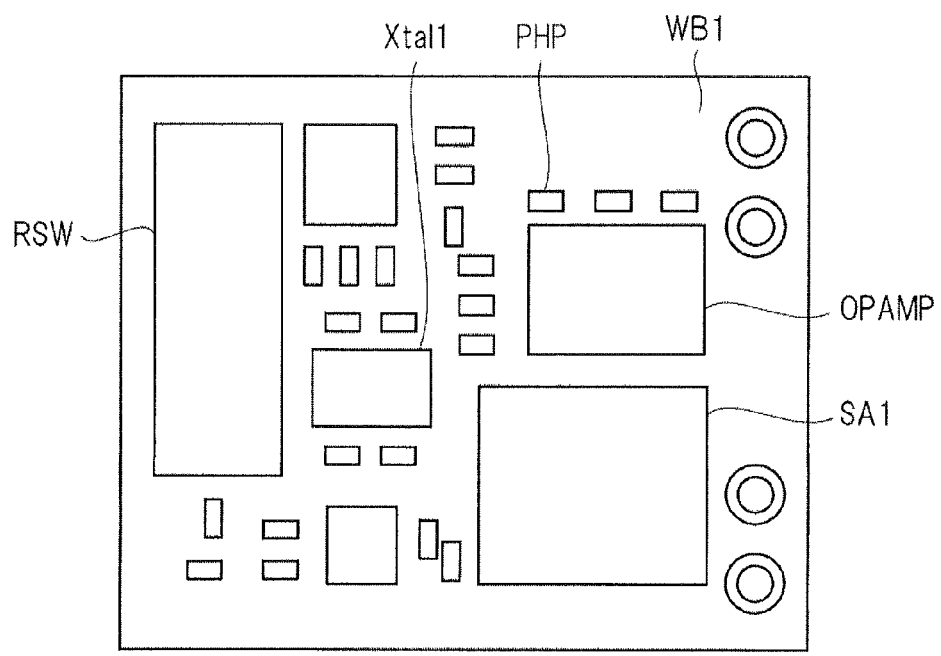
FIG. 25B is a bottom view of the first wiring board in the modification.

FIG. 25A is a top view of the wiring board WB1 in a modification, and FIG. 25B is a bottom view of the wiring board WB1 in the modification. As illustrated in FIG. 25B, the semiconductor device SA1, the operational amplifier OPAMP, and the peripheral components PHP can also be mounted on the lower surface of the wiring board WB1, not on the upper surface of the wiring board WB1 in which the connector CNT1 is mounted because of the reasons of a difference in the component configuration or the like.

In this case, in order to suppress a degradation of the reference clock input to the semiconductor device SA1, the crystal oscillator Xtal1 that outputs the reference clock to the semiconductor device SA1 is preferably arranged on the lower surface of the wiring board WB1 and also arranged so as to in proximity to the semiconductor device SA1.

For example, in the case of the configuration of the modification, the following advantage can be obtained. Namely, in the configuration of the modification, the connector CNT1 is mounted on the upper surface of the wiring board WB1, whereas the semiconductor device SA1 is mounted on the lower surface of the wiring board WB1. At this time, in the modification, first, in a state where the semiconductor device SA1 is mounted in one surface (lower surface) of the wiring board WB, heat treatment (reflow) is performed on the semiconductor device SA1 having a COB structure, and then the connector CNT1 and other electronic components are mounted in the other surface (upper surface) of the wiring board WB1 and the next heat treatment (reflow) is performed. In this case, according to the modification, a heat load on the connector CNT1 having a relatively low reflow-resistance during mounting of components can be reduced, and thus the reliability of the connector CNT1 can be enhanced.

Note that, in the modification, since the semiconductor device SA1, the operational amplifier OPAMP, and the peripheral components PHP are mounted on the lower surface of the wiring board WB1 as illustrated in FIG. 25B, the sensor module SM and/or regulator RGL can be mounted on the same surface (upper surface) as the connector CNT1 as illustrated in FIG. 25A. As described above, also in the modification, since the electronic components can be mounted on both surfaces of the wiring board WB1, the reduction in size of the wiring board WB1 can be achieved.

As described above, according to the fifth embodiment, due to a synergistic effect of a device for achieving the reduction in size of the wiring board WB1 accompanying the improvement of the performance and a device for achieving the reduction in size of the wiring board WB2 associated with the improvement of the performance, the reduction in size of the whole module unit MJU1 including the wiring board WB1 and wiring board WB2 can be achieved while achieving the improvement of the performance.

Hereinbefore, the present invention of the present inventor has been described specifically according to the embodiments. However, it is obvious that the present invention is not limited to the embodiments, but various modifications are possible without departing from the gist of the invention.

The above-described embodiments include the following forms.

(Addition 1)

An electronic device serving as an element of a wireless communication system, the electronic device including: a first wiring board; and a second wiring board electrically coupled via the first wiring board and a connector, in which the first wiring board and the second wiring board are stacked in a state where an upper surface of the first wiring board faces a lower surface of the second wiring board, to thereby constitute a module unit, in which a part of the connector, a first semiconductor device electrically coupled to the part of the connector, and a first electronic component electrically coupled to the first semiconductor device are mounted on the upper surface of the first wiring board, in which a sensor that detects a physical quantity is mounted on the lower surface of the first wiring board, in which a communication antenna and a second semiconductor device electrically coupled to the communication antenna are mounted on the upper surface of the second wiring board, and in which other part of the connector electrically coupled to the second semiconductor device and a second electronic component electrically coupled to the second semiconductor device are mounted on the lower surface of the second wiring board.

(Addition 2)

The electronic device according to addition 1, in which the second semiconductor device functions as a wireless communication unit configured to transmit data based on an output signal from the sensor.

(Addition 3)

The electronic device according to addition 2, in which the second wiring board has a rectangular shape with a pair of sides facing each other, in which the communication antenna is arranged on one side of the pair of side, and in which the second semiconductor device is arranged on the other side of the pair of sides, (Addition 4)

The electronic device according to addition 3, in which a balun electrically coupled to the second semiconductor device and the communication antenna is further mounted on the upper surface of the second wiring board, and in which the balun is arranged between the second semiconductor device and the communication antenna in a plan view.

(Addition 5)

The electronic device according to addition 1, in which the second wiring board includes an overlapping area that planarly overlaps with the first wiring board and a non-overlapping area that does not planarly overlap with the first wiring board, in which the communication antenna is arranged in the non-overlapping area of the upper surface of the second wiring board, and in which the second semiconductor device is arranged in the overlapping area of the upper surface of the second wiring board.

(Addition 6)

The electronic device according to addition 5, in which a balun electrically coupled to the second semiconductor device and the communication antenna is further mounted on the upper surface of the second wiring board, and in which the balun is arranged in the overlapping area.

(Addition 7)

The electronic device according to addition 1, in which the second wiring board includes an overlapping area that planarly overlaps with the first wiring board and a non-overlapping area that does not planarly overlap with the first wiring board, in which the other part of the connector and the second electronic component are arranged in the overlapping area of the lower surface of the second wiring board.

(Addition 8)

The electronic device according to addition 7, in which an arrangement position of the other part of the connector is more distant from the non-overlapping area than an arrangement position of the second electronic component.

(Addition 9)

The electronic device according to addition 1, in which the second semiconductor device includes a second semiconductor chip that is mounted in a chip state on the upper surface of the second wiring board.

(Addition 10)

The electronic device according to addition 9, in which the second semiconductor chip is sealed with a potting resin.

(Addition 11)

The electronic device according to addition 1, in which the second electronic component is a second crystal oscillator.
(Addition 12)
The electronic device according to addition 11, in which the second crystal oscillator is arranged in an area in which the second crystal oscillator overlaps with the second semiconductor device in a plan view.
(Addition 13)
The electronic device according to addition 2, in which the first semiconductor device functions as a digital data processing unit of a data processing unit configured to process a signal output from a sensor and output a processed signal to the wireless communication unit, the data processing unit being constituted of an analog data processing unit and the digital data processing unit.
(Addition 14)
The electronic device according to addition 13, in which the first semiconductor device also has a function as an AD conversion unit, and in which the first electronic component is an operational amplifier that outputs a reference potential to the AD conversion unit.
(Addition 15)
The electronic device according to addition 13, in which a first crystal oscillator that outputs a reference clock to the first semiconductor device is further mounted on the lower surface of the first wiring board.
(Addition 16)
The electronic device according to addition 15, in which the first crystal oscillator is arranged in an area in which the first crystal oscillator overlaps with the first semiconductor device in a plan view.
(Addition 17)
The electronic device according to addition 1, in which the sensor is arranged in an area in which the sensor overlaps with a part of the connector in a plan view.
(Addition 18)
The electronic device according to addition 1, in which the first semiconductor device includes a first semiconductor chip mounted in a chip state on the upper surface of the first wiring board.
(Addition 19)
The electronic device according to addition 18, in which the first semiconductor chip is sealed with a potting resin.
(Addition 20)
The electronic device according to addition 1, in which a reed switch activated by magnetism is further mounted on the lower surface of the first wiring board.
(Addition 21)
The electronic device according to addition 20, in which a height of the reed switch is larger than a height of the connector.
(Addition 22)
The electronic device according to addition 20, in which the electronic device includes a sealed case, in which the case includes a volume part with a space, and in which the module unit is housed in the space of the volume part.
(Addition 23)
An electronic device serving as an element of a wireless communication system, the electronic device including: a first wiring board; and a second wiring board electrically coupled via the first wiring board and a connector, in which the first wiring board and the second wiring board are stacked in a state where an upper surface of the first wiring board faces a lower surface of the second wiring board, to thereby constitute a module unit, in which a part of the connector and a sensor that detects a physical quantity are mounted on the upper surface of the first wiring board, in which a first semiconductor device electrically coupled to the part of the connector and a first electronic component electrically coupled to the first semiconductor device are mounted on the lower surface of the first wiring board, in which a communication antenna and a second semiconductor device electrically coupled to the communication antenna are mounted on the upper surface of the second wiring board, and in which other part of the connector electrically coupled to the second semiconductor device and a second electronic component electrically coupled to the second semiconductor device are mounted on the lower surface of the second wiring board.
(Addition 24)
The electronic device according to addition 23, in which the first semiconductor device functions as a digital data processing unit of a data processing unit configured to process a signal output from a sensor and to output a processed signal to a wireless communication unit, the data processing unit being constituted of an analog data processing unit and the digital data processing unit, in which the first semiconductor device also has a function as an AD conversion unit, in which the first electronic component is an operational amplifier that outputs a reference potential to the AD conversion unit, and in which a first crystal oscillator that outputs a reference clock to the first semiconductor device is also mounted on the lower surface of the first wiring board.

What is claimed is:
1. An electronic device serving as an element of a wireless communication system, the electronic device comprising:
a module unit,
a battery that supplies electric power to the module unit, and
a coupling part that electrically couples the module unit and the battery,
wherein the module unit includes:
a sensor that detects a physical quantity;
a wireless communication unit configured to transmit data based on an output signal from the sensor; and
a plurality of wiring boards, the sensor and the wireless communication unit being respectively disposed on surfaces of the plurality of wiring boards that face away from each other.
2. The electronic device according to claim 1, wherein the plurality of wiring boards of the module unit includes a first wiring board in which the sensor is mounted, and a second wiring board in which an electronic component constituting the wireless communication unit is mounted, and
wherein the first wiring board and the second wiring board are stacked.
3. The electronic device according to claim 2, wherein the first wiring board and the second wiring board are electrically coupled by a first detachable connector and are mechanically coupled by the first connector and an adhesive material.
4. The electronic device according to claim 2, wherein the first wiring board is arranged above the battery, and
wherein the second wiring board is arranged above the first wiring board.
5. The electronic device according to claim 4, wherein an electronic component is mounted on both surfaces of the first wiring board,
wherein the sensor is mounted on a lower surface of the first wiring board, and
wherein the sensor adheres to the battery.

6. The electronic device according to claim 4, wherein an upper surface of the battery has a first area that planarly overlaps with the first wiring board or the second wiring board and a second area that does not planarly overlap with the first wiring board and the second wiring board,
- wherein the coupling part includes a second detachable connector, and
- wherein the second connector is arranged over the second area of the battery.

7. The electronic device according to claim 6, wherein the coupling part includes a first wiring that electrically couples the first wiring board and the second connector, and a second wiring that electrically couples the battery and the second connector,
- wherein the first wiring bypasses and couples the first wiring board and the second connector at a distance longer than a shortest connectable distance, and
- wherein the second wiring bypasses and couples the battery and the second connector at a distance longer than a shortest connectable distance.

8. The electronic device according to claim 2, wherein an upper surface of the first wiring board includes a first overlapping area that planarly overlaps with the second wiring board and a first non-overlapping area that does not planarly overlap with the second wiring board,
- wherein an upper surface of the second wiring board includes a second overlapping area that planarly overlaps with the first wiring board and a second non-overlapping area that does not planarly overlap with the first wiring board, and
- wherein a formation direction of the first non-overlapping area with respect to the first overlapping area and a formation direction of the second non-overlapping area with respect to the second overlapping area are opposite directions.

9. The electronic device according to claim 8, wherein a joining portion between the module unit and the coupling part is formed in the first non-overlapping area of the first wiring board.

10. The electronic device according to claim 9, wherein the coupling part includes a wiring,
- wherein a terminal having a penetrating structure is formed in the first non-overlapping area of the first wiring board, and
- wherein the joining portion is formed by inserting the wiring into the terminal.

11. The electronic device according to claim 8, wherein a communication antenna is mounted in the second non-overlapping area of the second wiring board.

12. The electronic device according to claim 11, wherein the communication antenna does not planarly overlap with the battery.

13. The electronic device according to claim 1, wherein the battery comprises a rechargeable secondary battery.

14. The electronic device according to claim 13, wherein the battery comprises a wirelessly-chargeable secondary battery, and
- wherein the electronic device further includes a wireless power-feeding antenna electrically coupled to the battery.

15. The electronic device according to claim 14, wherein the electronic device further includes a communication antenna electrically coupled to the wireless communication unit, and
- wherein the wireless power-feeding antenna and the communication antenna do not planarly overlap with each other.

16. The electronic device according to claim 1, wherein the battery comprises a primary battery.

17. The electronic device according to claim 1, wherein the module unit and the battery are planarly arranged side by side.

18. The electronic device according to claim 1, wherein the electronic device includes a sealed case,
- wherein the case includes a volume part with a space, and
- wherein the module unit, the battery, and the coupling part are housed in the space of the volume part.

19. The electronic device according to claim 18, wherein at least one of the module unit and the battery adheres to the case.

20. An electronic device serving as an element of a wireless communication system, the electronic device comprising:
- a module unit,
- a battery that supplies electric power to the module unit, and
- a coupling part that electrically couples the module unit and the battery,
- wherein the module unit includes:
  - a sensor that detects a physical quantity; and
  - a wireless communication unit configured to transmit data based on an output signal from the sensor,
- wherein the module unit includes a first wiring board in which the sensor is mounted, and a second wiring board in which an electronic component constituting the wireless communication unit is mounted, and
- wherein the first wiring board and the second wiring board are stacked.

* * * * *